(12) United States Patent
Achard et al.

(10) Patent No.: US 12,078,149 B2
(45) Date of Patent: Sep. 3, 2024

(54) CROSS-FLOW WIND TURBINE WITH TWIN BLADES AND INCLINED ROTATION AXES

(71) Applicant: COLLABORATIVE ENERGY, Voreppe (FR)

(72) Inventors: Jean-Luc Achard, Voreppe (FR); Sébastien Cussac, Voreppe (FR)

(73) Assignee: Collaborative Energy, Voreppe (FR)

( * ) Notice: Subject to any disclaimer, the term of this patent is extended or adjusted under 35 U.S.C. 154(b) by 0 days.

(21) Appl. No.: 18/547,083

(22) PCT Filed: Feb. 16, 2022

(86) PCT No.: PCT/EP2022/053753
§ 371 (c)(1),
(2) Date: Aug. 18, 2023

(87) PCT Pub. No.: WO2022/175301
PCT Pub. Date: Aug. 25, 2022

(65) Prior Publication Data
US 2024/0141866 A1 May 2, 2024

(30) Foreign Application Priority Data

Feb. 18, 2021 (FR) ..................................... 2101609

(51) Int. Cl.
*F03D 3/00* (2006.01)
*F03D 3/02* (2006.01)
(Continued)

(52) U.S. Cl.
CPC ............... *F03D 3/02* (2013.01); *F03D 3/005* (2013.01); *F03D 3/011* (2023.08); *F03D 9/25* (2016.05);
(Continued)

(58) Field of Classification Search
CPC . F03D 3/005; F03D 3/011; F03D 3/02; F05B 2240/37; F05B 2240/212
See application file for complete search history.

(56) References Cited

U.S. PATENT DOCUMENTS

| | | | |
|---|---|---|---|
| 4,023,368 A * | 5/1977 | Kelly | ..................... F24S 50/20 136/246 |
| 7,189,051 B1 | 3/2007 | Heifets | |

(Continued)

FOREIGN PATENT DOCUMENTS

| | | |
|---|---|---|
| FR | 2973843 A1 | 10/2012 |
| JP | 59-190482 A | 10/1984 |

(Continued)

OTHER PUBLICATIONS

Jin et al. "Investigation into parameter influence of upstream deflector on vertical axis wind turbines output power via three-dimensional CFD simulation" Renewable Energy 115 (2018) 41-53, accepted Aug. 6, 2017.

(Continued)

*Primary Examiner* — Brian P Wolcott
*Assistant Examiner* — Behnoush Haghighian
(74) *Attorney, Agent, or Firm* — TraskBritt

(57) ABSTRACT

A wind turbine includes twin cross-flow turbines connected to a generator. The generator includes a shaft configured to be rotated when the turbines rotate. The wind turbine includes a first turbine rotatably movable around a first axis of rotation and including several blades distributed around the first axis of rotation. A second turbine is rotatably movable around a second axis of rotation and includes several blades distributed around the second axis of rotation. The first axis of rotation and the second axis of rotation are symmetrical to each other relative to a vertical axis. The first axis of rotation and the second axis of rotation are inclined (Continued)

relative to the vertical axis at an angle of inclination of between 25° and 50°.

24 Claims, 16 Drawing Sheets

(51) Int. Cl.
*F03D 9/25* (2016.01)
*F03D 15/00* (2016.01)

(52) U.S. Cl.
CPC ........ *F03D 15/00* (2016.05); *F05B 2220/706* (2013.01); *F05B 2240/212* (2013.01); *F05B 2240/37* (2020.08)

(56) References Cited

U.S. PATENT DOCUMENTS

| | | | | |
|---|---|---|---|---|
| 7,896,609 | B2* | 3/2011 | Mitchell | F03D 7/06 415/4.4 |
| 8,546,972 | B2* | 10/2013 | Deng | H02K 19/38 290/55 |
| 9,041,240 | B2* | 5/2015 | Ishimine | F03D 9/25 290/55 |
| 9,284,944 | B2* | 3/2016 | Yoon | F03D 3/064 |
| 9,546,642 | B2* | 1/2017 | Deng | F03B 13/00 |
| 10,844,834 | B2* | 11/2020 | Achard | H02K 7/102 |
| 11,236,723 | B2* | 2/2022 | Hossain | F03D 3/02 |
| 11,486,353 | B2* | 11/2022 | Suzuki | F03D 3/062 |
| 11,635,058 | B2* | 4/2023 | Suzuki | F03D 3/02 290/55 |
| 2016/0312768 | A1* | 10/2016 | Takakura | F03D 80/70 |
| 2019/0128241 | A1* | 5/2019 | Achard | F03D 3/04 |
| 2020/0217297 | A1* | 7/2020 | Hossain | F03D 3/005 |

FOREIGN PATENT DOCUMENTS

| | | |
|---|---|---|
| JP | 2003-120510 A | 4/2003 |
| WO | 2017/153676 A1 | 9/2017 |

OTHER PUBLICATIONS

International Search Report for International Application No. PCT/EP2022/053753, mailed May 16, 2022, 5 pages with English translation.

International Written Opinion for International Application No. PCT/EP2022/053753, mailed May 16, 2022, 11 pages with English machine translation.

Jin et al. "Investigation into parameter influence of upstream deflector on vertical axis wind turbines output power via three-dimensional CFD simulation" Renewable Energy, vol. 115, Jan. 2018, pp. 41-53 (Abstract only).

Tjiu et al. "Darrieus vertical axis wind turbine for power generation I: Assessment of Darrieus VAWT configurations" Renewable Energy 75 (Accepted Sep. 18, 2014) pp. 50-67.

* cited by examiner

CROSS-FLOW WIND TURBINE WITH TWIN BLADES AND INCLINED ROTATION AXES

CROSS-REFERENCE TO RELATED APPLICATIONS

This application is a national phase entry under 35 U.S.C. § 371 of International Patent Application PCT/EP2022/053753, filed Feb. 16, 2022, designating the United States of America and published as International Patent Publication WO 2022/175301 A1 on Aug. 25, 2022, which claims the benefit under Article 8 of the Patent Cooperation Treaty to French Patent Application Serial No. FR2101609, filed Feb. 18, 2021.

TECHNICAL FIELD

The technical field of the disclosure is transverse flow wind turbines.

BACKGROUND

Renewable energies are experiencing strong growth. As a result, large-scale wind turbine installations, both onshore and offshore, have grown rapidly in recent decades. Most wind turbines installed are horizontal-axis wind turbines (HAWT), with the rotation axis parallel to the direction of the incident wind.

Other types of wind turbine include cross-flow turbines, in which the rotation axis is perpendicular to the direction of the incident wind. The rotation axis is usually vertical. This type of wind turbine is usually referred to as a vertical-axis wind turbine (VAWT).

Wind turbines with a vertical rotation axis have been described in JP 59190482, FR2973843 and U.S. Pat. No. 7,189,051. These are Savonius wind turbines.

Darrieus cross-flow wind turbines can comprise straight or curved blades. Vertical wind turbines with curved blades have blades extending about a central, vertical, rotary shaft, which also forms a pylon. The development of this type of wind turbine has been modest, due to a reputation for fragility, particularly in the case of very tall turbines. Unlike horizontal wind turbines, very tall vertical wind turbines are subject to stable winds at height, but also, closer to the ground, to a zone known as the "boundary layer," which is liable to turbulence. The result is a certain sensitivity to fatigue.

To improve stiffness, a vertical wind turbine with a curved, tall blade can be stiffened by cables running between the top of the turbine and the ground. However, this significantly increases the footprint, which is particularly detrimental to offshore installations. Furthermore, the cables apply downward pressure to the bearings enabling rotation of the shaft. This requires the use of particularly robust bearings, which increases the complexity and cost of the wind turbine. Moreover, the presence of a solid rotary shaft at the center of each blade generates turbulence (Karman vortices), affecting performance of the wind turbine. Finally, during blade rotation, under the effect of cyclic aerodynamic forces, the central rotary shaft and the retaining cables can be subjected to vibrations, which can lead to resonant instabilities, particularly when the central shaft is very tall or the cables are very long.

Nowadays, the majority of high-power wind turbines are horizontal wind turbines. However, such wind turbines have many drawbacks: the generator, which produces electricity from the rotation of the blades, is suspended on a nacelle and raised to a great height. The same applies to the main transmission and control components, such as gearboxes, brakes, and control systems. As a result, the nacelle is installed at height and bears a lot of weight, which is detrimental to stability on account of high sensitivity to pitching and rolling. To compensate for these drawbacks, the mast supporting the nacelle and blades are solid, as are the foundations supporting the whole assembly, both on land or at sea. The height of the nacelle also complicates maintenance operations. Another drawback of horizontal wind turbines is the very large size of the blades, which, combined with the size of the mast, complicates both transport and installation, especially where the blades are manufactured as single parts. These blades are usually heavy, which results in high gravitational loading of the wind turbine. The blades can also have complex shapes, which increases cost.

Vertical straight-bladed Darrieus wind turbines have also been proposed. A notable advantage of vertical wind turbines is that, unlike horizontal-axis turbines, the generator and electromechanical transmission chain can be positioned at a low height. Another advantage is the sensitivity to all wind directions, which obviates the need to adjust the yaw angle of the wind turbine. Furthermore, a straight-bladed wind turbine has a smaller footprint, and is less sensitive to differences in wind speed as a function of height.

US2020/0217297 describes a wind turbine with various vertical-axis Darrieus turbines with curved blades. The turbines are spaced apart from one another and connected to a generator by means of long horizontal shafts. The result is a bulky wind turbine with a large footprint.

Document WO2017153676 describes a wind turbine comprising twin vertical-axis Darrieus turbines with straight blades, in which the turbines are symmetrical to each other about a vertical mid-plane. The counter-rotating turbines are supported by a central mast, and two horizontal supports perpendicular to the median plane extend from the top of the mast. The ends of the vertical blades of each turbine are extended by shaped horizontal arms, rotating about a vertical rotation axis. In general terms, the higher efficiency of a twin turbine compared to a single turbine is linked to a partial lateral blocking effect that occurs when the blades move in the inter-turbine zone. In this zone, the vertical median plane between the counter-rotating turbines prevents the incident flow from diverting away from the turbines. However, two conditions must be met: the turbines must rotate at the same speed and in the same angular positional relationship. Synchronizing the two turbines requires these two conditions to be met. On the other hand, the blades can turn in the upwind direction or in the downwind direction in this zone.

However, this type of design has a drawback related to the centrifugal forces acting on the vertical blades of the turbines during rotation. Under the effect of centrifugal forces, the vertical blades are subjected to bending stresses, tending to expand the turbines laterally, i.e., to increase the diameter thereof. This results in undesirable vibrations, which affect efficiency. Moreover, the horizontal arms of large turbines are subject to downward deformation due to the weight of the vertical blades, which occurs when the turbines are at a standstill, when centrifugal forces are no longer compensating for gravity. This results in fatigue effects at the arm/blade joins.

Finally, cyclical aerodynamic forces acting on the vertical portions, in either the downwind or upwind direction, periodically break the symmetry of each blade. The aerodynamic forces are directed towards the inside of the turbine when a vertical blade is turning upwind, and towards the outside of the turbine when the blade is turning in the opposite direction. The result is cyclic asymmetry, which generates oscillations during each rotation.

Twin turbines help to increase the efficiency of the wind turbine. However, the use of two generators, with each generator connected to a turbine, results in a degree of complexity. The generators are controlled by an electronic power system to synchronize the turbines, which entails additional costs and requires regular resetting.

Furthermore, the holding structure of the turbine is liable to generate bending stresses, which can cause vibrations. This can also lead to premature wear of the structure.

BRIEF SUMMARY

The disclosure describes a wind turbine designed to avoid or reduce the drawbacks discussed above.

One objective of embodiments of the disclosure is to provide a wind turbine comprising twin cross-flow turbines connected to a generator, the generator comprising a shaft designed to be driven in rotation under the effect of a rotation of the turbines, the wind turbine comprising:
- a first turbine movable in rotation about a first rotation axis, the first turbine comprising several blades distributed about the first rotation axis,
- a second turbine movable in rotation about a second rotation axis, the second turbine comprising several blades distributed about the second rotation axis,
- the first rotation axis and the second rotation axis preferably being symmetrical to each other with respect to a vertical axis, and
- the first rotation axis and the second rotation axis are inclined with respect to the vertical axis at an angle of inclination, preferably the same angle of inclination, of between 25° and 50°.

Advantageously, the wind turbine defines a median plane, the median plane:
- being perpendicular to a downstream plane, the downstream plane containing the first rotation axis and the second rotation axis, and
- passing through a point of intersection of the first rotation axis and the second rotation axis.

The median plane can form a plane of symmetry of the wind turbine. The median plane can notably be vertical. The same applies to the downstream plane.

Advantageously, each rotation axis converges on a single generator, so that the preferably horizontal shaft of the generator is driven in rotation by the first turbine and by the second turbine.

Preferably:
- each turbine extends about a rotation axis between a lower end and an upper end, the lower end being closer to the generator than the upper end,
- the lower end and the upper end of each turbine are aligned with the rotation axis of the turbine,
- each blade of a turbine comprises:
  - a lower portion extending from the lower end, and
  - an upper portion extending from the upper end, and
- each blade extends from the lower end towards the upper end so that:
  - the radius of the blade corresponding to the distance between the blade and the rotation axis along the lower portion gradually increases as the distance from the lower end increases, and
  - the radius of the blade gradually decreases along the upper portion as the distance from the upper end decreases.

Advantageously:
- at the lower end, the lower portion forms a lower opening angle with the rotation axis, the lower opening angle being acute, and
- at the upper end, the upper portion forms an upper opening angle with the rotation axis, the upper opening angle being acute.

Preferably, the upper opening angle and the lower opening angle are equal and form the same opening angle. The opening angle can be between 40° and 60°.

Preferably, each blade has a straight lower portion and/or a straight upper portion.

According to one embodiment:
- each blade has an equatorial portion connecting the lower portion and the upper portion, and
- in the equatorial portion, the radius of the blade reaches a maximum radius.

According to one embodiment:
- the height of each blade corresponds to the distance between the lower end and the upper end, parallel to the rotation axis,
- each blade has a form factor, corresponding to a ratio between the height of the blade and twice the maximum radius of the blade, and
- the form factor of each blade is between 1.3 and 1.5.

Preferably:
- the equatorial portion is curved, and
- along the equatorial portion, from the lower portion, the radius gradually increases to the maximum radius of the blade, then gradually decreases, up to the upper portion.

According to one option, for each turbine:
- an equatorial plane extends perpendicular to the rotation axis, the equatorial plane passing through the maximum radius of each blade of the turbine, and
- the equatorial plane forms a plane of symmetry of the turbine.

Each blade may comprise:
- a lower join corresponding to a join between the lower portion and the equatorial portion, and
- an upper join corresponding to a join between the upper portion and the equatorial portion.

Each blade may be such that:
- the distance between the lower join and the upper join, parallel to the rotation axis, forms the height of the equatorial portion,
- a relative height of the equatorial portion corresponds to a ratio between the height of the equatorial portion and the height of the blade, and
- the relative height of each blade is greater than 0.5 and less than 0.8.

According to one embodiment:
- two blades belonging to two different turbines are separated by a minimum gap during rotation about the respective rotation axes,
- a form factor of the wind turbine corresponds to a ratio between the minimum gap and twice the maximum radius, and
- the form factor of the wind turbine is between 0.1 and 0.3.

According to one embodiment, each turbine comprises two blades, each blade being symmetrical to the other with respect to the rotation axis of the turbine. According to another embodiment, each turbine has three blades, evenly spaced about the rotation axis of the turbine.

Preferably:
- the first turbine is connected:
  - at the lower end thereof to a first lower rotary shaft, and at the upper end thereof to a first upper rotary shaft,
the first lower rotary shaft, the first upper rotary shaft and the first rotation axis being coaxial,
the second turbine is connected:
at the lower end thereof to a second lower rotary shaft, and
at the upper end thereof to a second upper rotary shaft,
the second lower rotary shaft, the second upper rotary shaft and the second rotation axis being coaxial,
the wind turbine comprises a holding structure, the holding structure comprising:
a nacelle supporting the generator,
a mast extending vertically from the nacelle, the mast being centered with respect to the median plane, the mast being set back from the downstream plane by a setback distance in a longitudinal direction perpendicular to the downstream plane,
a first upper arm extending from the mast to a first upper support, the first upper support holding the first upper rotary shaft, and
a second upper arm extending from the mast to a second upper support, the second upper support holding the second upper rotary shaft,
the first upper arm and the second upper arm being inclined with respect to a vertical axis.

According to one option:
the first upper support comprises a bearing into which the first upper rotary shaft is inserted, and
the second upper support comprises a bearing into which the second upper rotary shaft is inserted.

The holding structure can also comprise:
a king post extending from the mast away from the downstream plane,
a first brace extending between the king post and the first upper arm, and
a second brace extending between the king post and the second upper arm.

According to one option:
the first brace extends between the king post and the first upper support, and
the second brace extends between the king post and the second upper support.

According to one embodiment, the first upper arm and the second upper arm comprise successive elementary arms extending respectively towards the first upper support and the second upper support, each elementary arm being more inclined with respect to the vertical as the elementary arm approaches the first upper support or the second upper support.

According to one embodiment, at least one strut extends between the mast and the nacelle, the strut being inclined with respect to the vertical and extending from the mast towards the downstream plane.

According to one embodiment, the nacelle is movable in rotation about a vertical rotation axis, about which the mast extends, so that the wind blowing in a direction spontaneously positions the turbines downstream of the mast, in the direction, under the effect of the thrust exerted by the wind on each turbine. According to another embodiment, the nacelle is fixed in rotation, the wind turbine being such that the turbines are arranged downstream of the mast, in a direction corresponding to a prevailing wind direction.

According to one embodiment, each lower rotary shaft is connected to the shaft of the generator by an angle transmission.

According to one embodiment, a brake is arranged between each angle transmission and each respective lower end of each turbine. Each brake can comprise a disk rigidly connected to the turbine, and a shoe rigidly connected to the angle transmission.

According to one embodiment, at least one crosspiece is arranged between two different blades of the same turbine. The join between the crosspiece and the two blades can form a fillet. According to one option, two different blades of the same turbine are connected by an upper crosspiece and a lower crosspiece that are arranged closer to the upper end and the lower end respectively of the turbine than to the equatorial plane.

According to one embodiment, the mast has a horizontal section extending parallel to the median plane $P_m$ between a convex upstream end and a downstream end, approaching the downstream plane $P_a$. The horizontal section of the mast can advantageously be tapered between the upstream end and the downstream end.

According to one embodiment, each arm has a shaped vertical section extending between a leading edge and a trailing edge, the trailing edge being oriented towards the downstream plane.

Embodiments of the disclosure can be better understood by reading the example embodiments disclosed in the description below, provided with reference to the figures below.

BRIEF DESCRIPTION OF THE DRAWINGS

FIG. 3D shows forces acting in a horizontal plane, about the upper support.

DETAILED DESCRIPTION

Figure 1A:
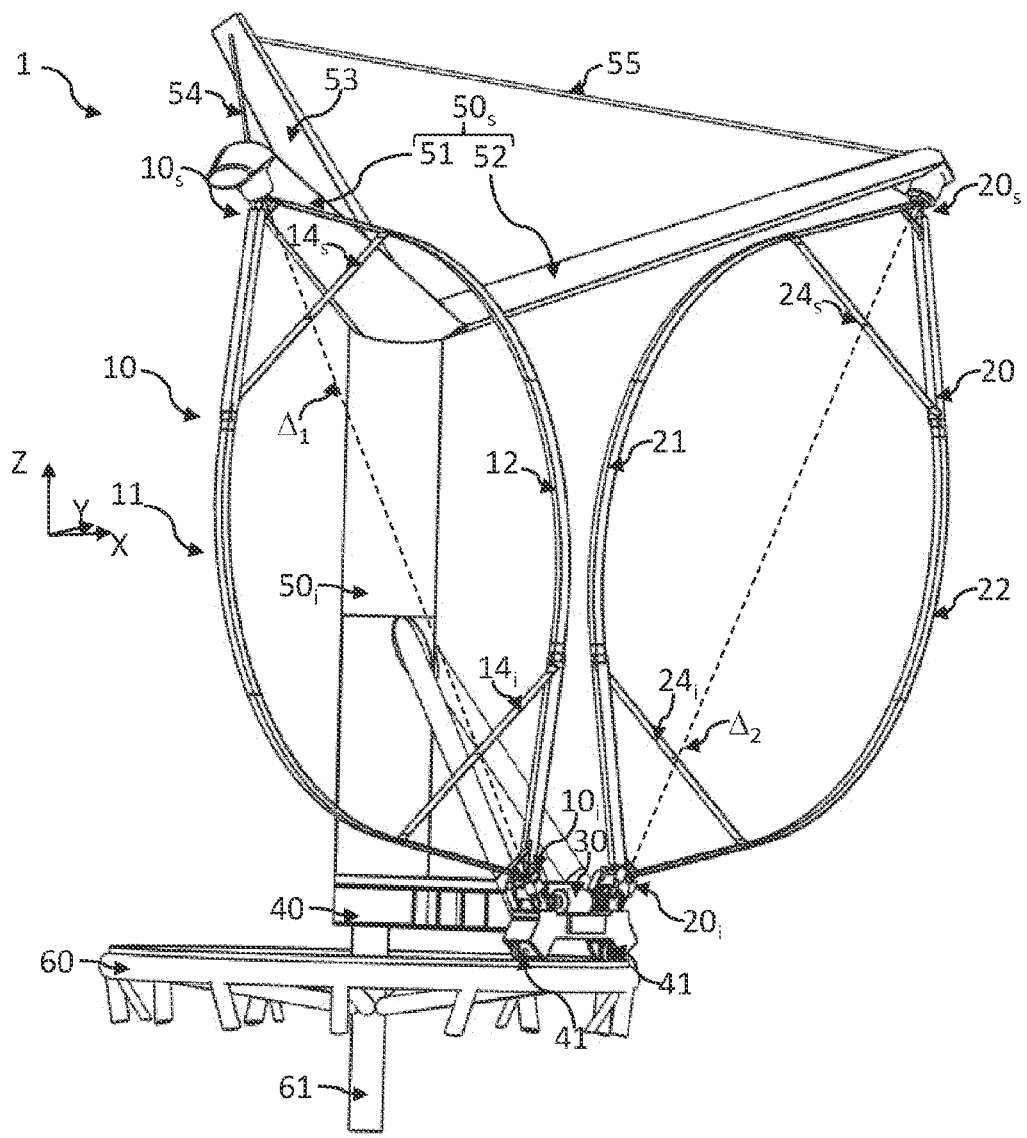
FIG. 1A is an overview of an example embodiment of a wind turbine with two blades.
Figure 1B:
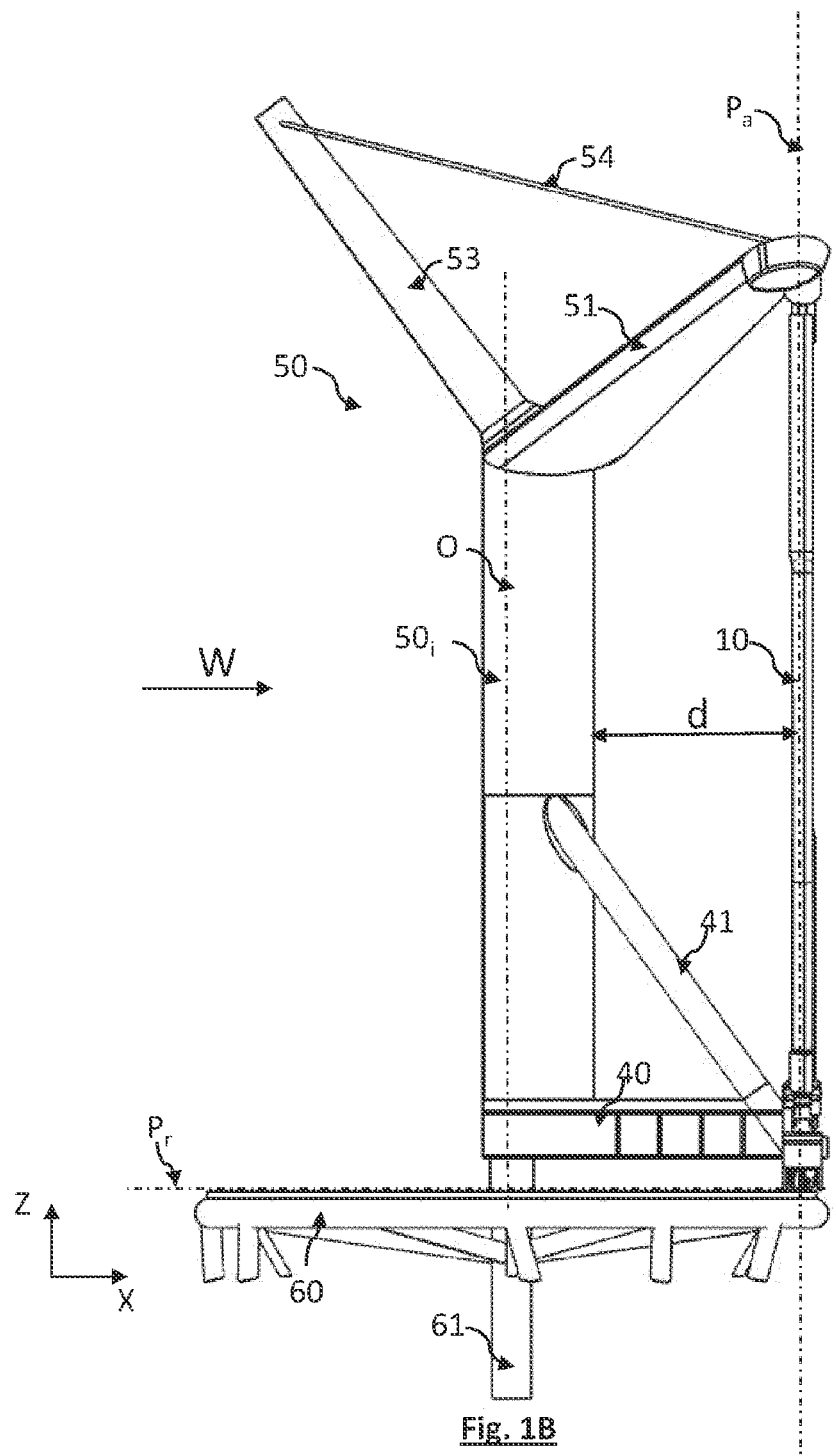
FIG. 1B is a side view of the wind turbine shown in FIG. 1A.
Figure 1C:
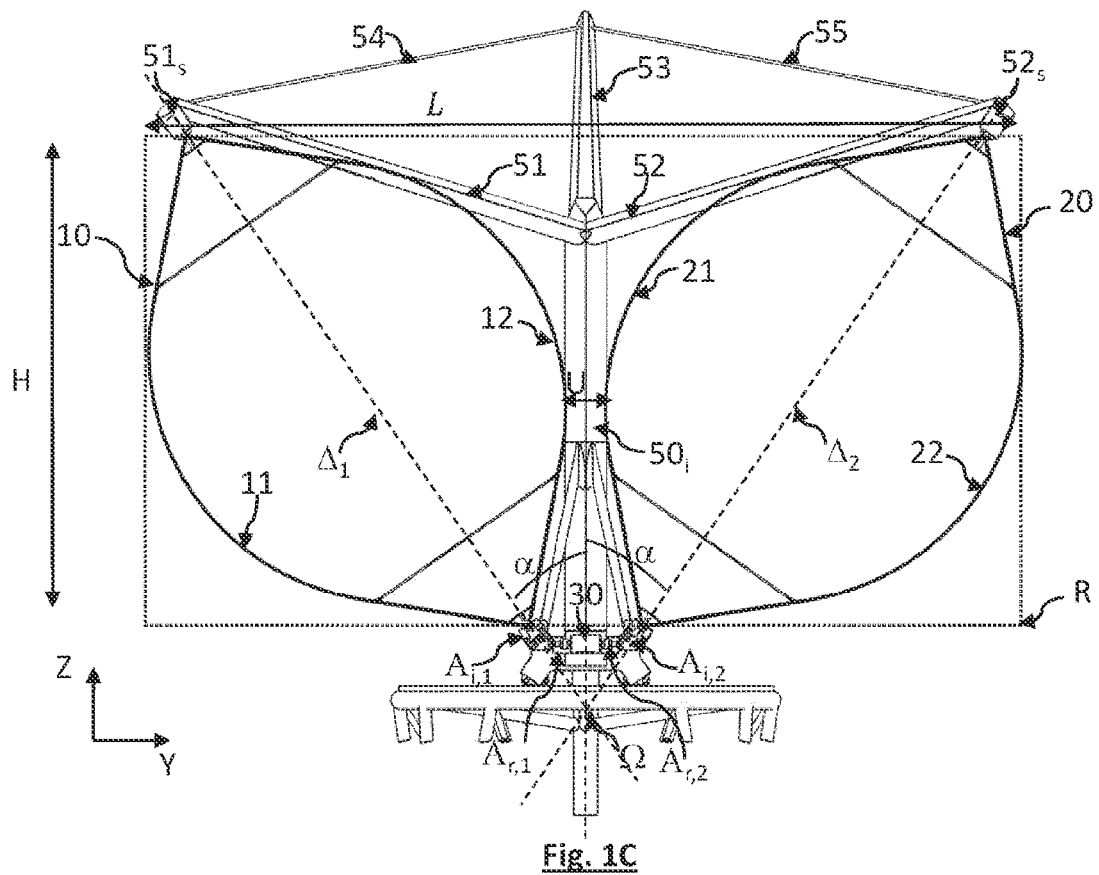
FIG. 1C is a downstream view of the wind turbine shown in FIG. 1A.

FIGS. 1A to 1C show views of an example of a wind turbine 1 according to embodiments of the disclosure. The wind turbine 1 comprises a first turbine 10 and a second turbine 20 of the cross-flow Darrieus type with curved blades. The first turbine 10 is movable in rotation about a first rotation axis $\Delta_1$. The second turbine 20 is movable in rotation about a second rotation axis $\Delta_2$. The first rotation axis and the second rotation axis are coplanar. The rotation axes lie in the same vertical plane $P_a$, known as the downstream plane. The term "downstream plane" refers to the fact that the plane is located downstream of the holding structure of the wind turbine 1, described below. The term downstream should be interpreted with reference to the wind flowing through the wind turbine 1. In the downstream plane, the first rotation axis $\Delta_1$ and the second rotation axis $\Delta_2$ are inclined at the same angle of inclination $\alpha$ to a vertical axis Z. The downstream plane $P_a$ is vertical.

"Cross-flow turbine" means that the turbine rotates under the effect of a wind blowing transversely to each rotation axis. In this case, the downstream plane $P_a$ is preferably perpendicular to the wind direction W. FIG. 1B is a side view perpendicular to the downstream plane $P_a$. FIG. 1C is an upstream view of the wind turbine 1, parallel to the downstream plane $P_a$.

The first rotation axis $\Delta_1$ and the second rotation axis $\Delta_2$ converge at a point of intersection $\Omega$ that is equidistant from each turbine. The plane perpendicular to the downstream plane $P_a$ and passing through the point of intersection $\Omega$ forms a median plane $P_m$ of the wind turbine 1. The first turbine 10 and the second turbine 20 are arranged symmetrically on the two sides of the median plane $P_m$, the latter forming a plane of symmetry. The first turbine and the second turbine are therefore twins, in the sense that the turbines are symmetrical to each other with respect to the median plane. The median plane $P_m$ is a vertical plane. As set out below, the median plane $P_m$ also forms a plane of symmetry of a holding structure 50 holding each turbine.

Each turbine has at least two blades, and preferably two or three blades. In the example shown in FIGS. 1A to 1C, each turbine has two blades: the first turbine 10 has a first blade 11 and a second blade 21, while the second turbine 20 has a first blade 21 and a second blade 22. Preferably, the blades are arranged so that the first turbine 10 and the second turbine 20 are counter-rotating. Examples of three-blade turbines are described below with reference to FIG. 5D.

The first turbine 10 extends between a first lower end $10_i$ and a first upper end $10_s$, located on the first rotation axis $\Delta_1$. The second turbine 20 extends between a second lower end $20_i$ and a second upper end $20_s$, located on the second rotation axis $\Delta_2$.

The wind turbine 1 includes a generator 30 designed to generate electricity from the rotation of the turbines. The first and second rotation axes converge on the same generator 30. The generator 30 comprises a rotor that is driven by both the first turbine 10 and the second turbine 20. In the example shown, the generator comprises a first driven rotary shaft $A_{r,1}$ and a second driven rotary shaft $A_{r,2}$, extending on the two sides of the generator 30. The first and second driven rotary shafts $A_{r,1}$, $A_{r,2}$ respectively transmit rotation from the first turbine 10 and the second turbine 20 to the rotor of the generator 30. The turbines can be either upwind (i.e., turning upwind when the blades are close to the mast) or downwind (i.e., turning downwind when the blades are close to the mast).

The first turbine 10 is connected to a first lower rotary shaft $A_{i,1}$ extending from the first lower end $10_i$ to the first driven rotary shaft $A_{r,1}$ of the generator 30, via an angle transmission. Symmetrically, the second turbine 20 is connected to a second lower rotary shaft $A_{i,2}$ extending from the second lower end $20_i$ to the second driven rotary shaft $A_{r,2}$ of the generator, via an angle transmission system. Each lower rotary shaft $A_{i,1}$, $A_{i,2}$ is respectively held at each lower end by a pivot link. Each lower rotary shaft has a driving action transmitted to the driven shafts $A_{r,1}$, $A_{r,2}$ of the generator by the angle transmissions. The driven shafts of the generator are mechanically coupled to a single drive shaft of the generator, which extends on the two sides of the generator. The drive shaft of the generator is thus simultaneously driven in rotation by both turbines 10 and 20, which is a noteworthy aspect of embodiments of the disclosure. Details of the mechanical transmission chain between each lower end and the generator are described with reference to FIGS. 7A to 7B.

The design of the wind turbine 1, which is intended to simultaneously drive a single generator using two turbines 10, 20 rotating about two converging rotation axes, enables the turbines to be mechanically synchronized. Driving the same generator using several turbines reduces the cost of the wind turbine 1, by reducing the number of generators required. Furthermore, this obviates the need for electronic synchronization systems to synchronize multiple generators, which requires regular resetting, as described in the prior art.

The generator can be an asynchronous squirrel-cage generator, a variable-speed generator with gearbox, a synchronous reluctance generator with gearbox (with no permanent rare-earth magnets) or a direct-drive synchronous generator. The generator can also be another type of generator.

In addition to mechanical synchronization, the convergence of the rotation axes towards the generator enables a compact generator centered in relation to the median plane to be used.

Description of the Turbines:

As previously described, the angle of inclination $\alpha$ of each rotation axis, relative to the vertical, is preferably between 25° and 50°, and preferably between 30° and 40°, for example 35°. Such angular ranges provide a good compromise between the height H of the turbines in the vertical direction (axis Z), and the width L of the turbines in the horizontal direction. The width L of the turbines is defined parallel to a lateral axis Y perpendicular to the median plane $P_m$. According to embodiments of the disclosure, the height H of the turbines in the vertical direction should be optimized to be sufficient to increase the frontal area, but low enough to exploit a wind layer in which the wind speed can be considered uniform. Furthermore, limiting the height keeps the center of gravity of the wind turbine 1 sufficiently low. The height H typically ranges from a few meters to over a hundred meters, for example between 5 m and 150 m. The height H and width L are linked by the angle of inclination $\alpha$.

Tilting the rotation axes increases the width L of the wind turbine 1. To maximize the frontal area of the wind turbine 1, the surface area occupied by each turbine within a rectangular perimeter R of height H and width L is preferably optimized. The perimeter R is represented by a dotted rectangular outline in FIG. 1C. The perimeter R is not tangible, but a virtual rectangle. To optimize filling, i.e., the surface area covered by each turbine within the perimeter, the shape of the blades can be optimized as described below.

Figure 2A:
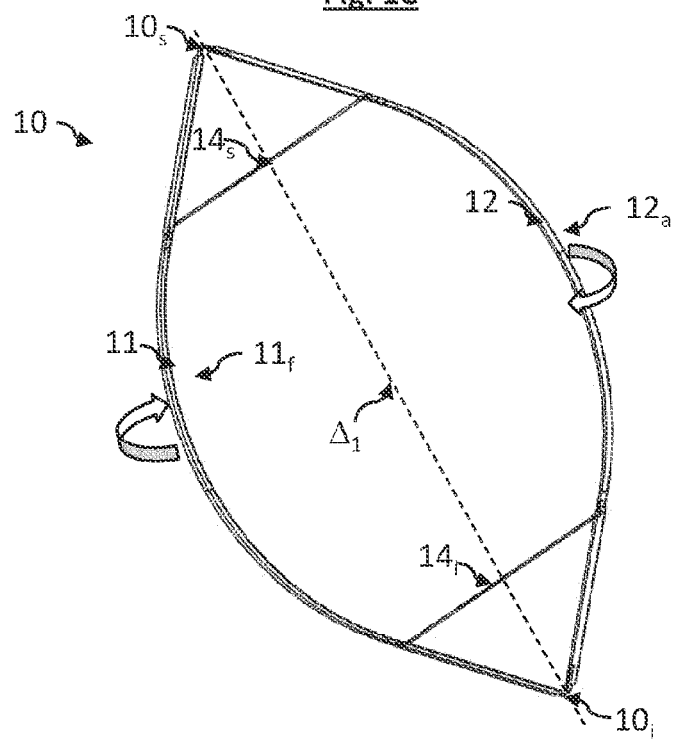
FIG. 2A is a view of a turbine from the wind turbine shown in the previous figures.

FIG. 2A shows the first blade 11 and the second blade 12 of the first turbine 10. FIG. 2A shows a leading edge $12_a$ of the second blade 12 and a trailing edge $11_f$ of the first blade 11. The first blade has an upper crosspiece $14_s$ and a lower crosspiece $14_i$. The crosspieces are perpendicular to the first rotation axis $\Delta_1$ and arranged between each blade. The crosspieces are intended to stiffen the turbine. The use of crosspieces is optional, and can be used for large turbines only. Similarly, the second turbine 20 has a lower crosspiece $24_i$ and an upper crosspiece $24_s$. A preferred form of the crosspiece is described with reference to FIGS. 6A to 6E.

Each blade extends between the lower end $10_i$ and the upper end $10_s$ of the turbine 10, approximating a troposkein curve, i.e., a curve formed by a rope rotating at constant angular velocity about a rotation axis. The troposkein shape increases the tensile stresses exerted on each blade, which minimizes bending stresses. As mentioned in the prior art, bending stresses applied to a turbine blade generate undesirable vibrations, adversely affecting the operation and performance of the wind turbine 1. Encouraging the generation of tensile stresses reduces or eliminates the risk of undesirable vibrations occurring when the blade rotates about the rotation axis. As the turbine rotates, each blade is subjected to a centrifugal force, which tends to widen the turbine. The result is a tensile stress applied along each blade, between the two lower ends $10_i$, $20_i$ and the two upper ends $10_s$, $20_s$.

Where the shape of each blade tends towards a troposkein curve, each turbine, which is formed by a combination of several identical, evenly-spaced blades, assumes a tapered shape.

Unlike the troposkein turbines in the prior art, each turbine has no central shaft coaxial with the rotation axis between the upper end $10_s$ and the lower end $10_i$.

Figure 2B:
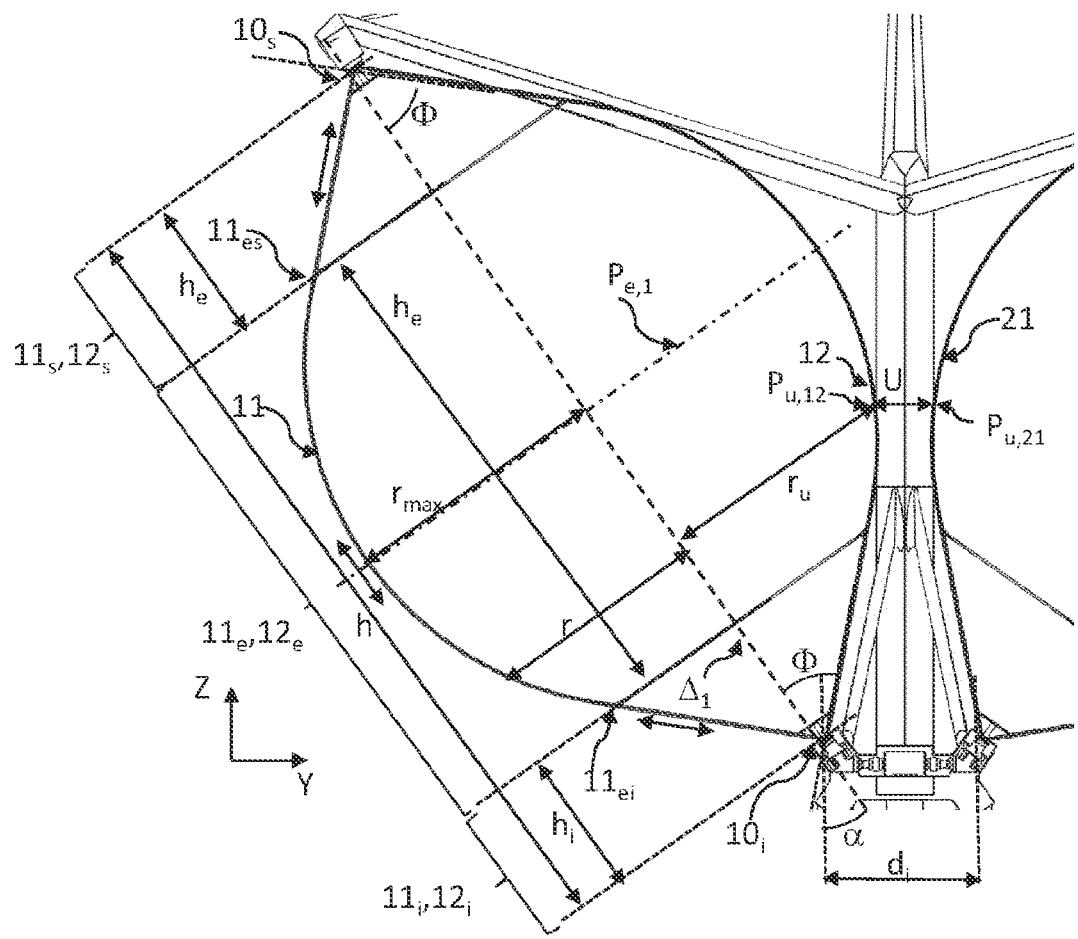
FIG. 2B is a view of the turbine lying in a downstream plane of the wind turbine.

FIG. 2B shows a detail of the first turbine 10. In this example, the first blade 11 is symmetrical to the second blade 12 with respect to the first rotation axis $\Delta_1$. In the remainder of the description, the distance between a point of a blade and the rotation axis is referred to as the "radius." Each blade has a lower portion $11_i$, $12_i$ extending from the lower end $10_i$ over a lower height $h_i$, the latter being measured parallel to the rotation axis. Along the lower portion $11_i$ (or $12_i$) the radius (i.e., the distance between the blade and the rotation axis), increases gradually as the distance from the lower end $10_i$ increases. Preferably, the radius of each blade is greatest at the midpoint (parallel to the rotation axis), i.e., at an equal distance from the lower end and the upper end. Each blade has an upper portion $11_s$, $12_s$ extending from the upper end $10_s$ over an upper height $h_s$, the latter being measured parallel to the rotation axis. Similarly, the radius decreases along the upper portion $11_s$ (or $12_s$) closer to the upper end $10_s$.

Figure 2C:
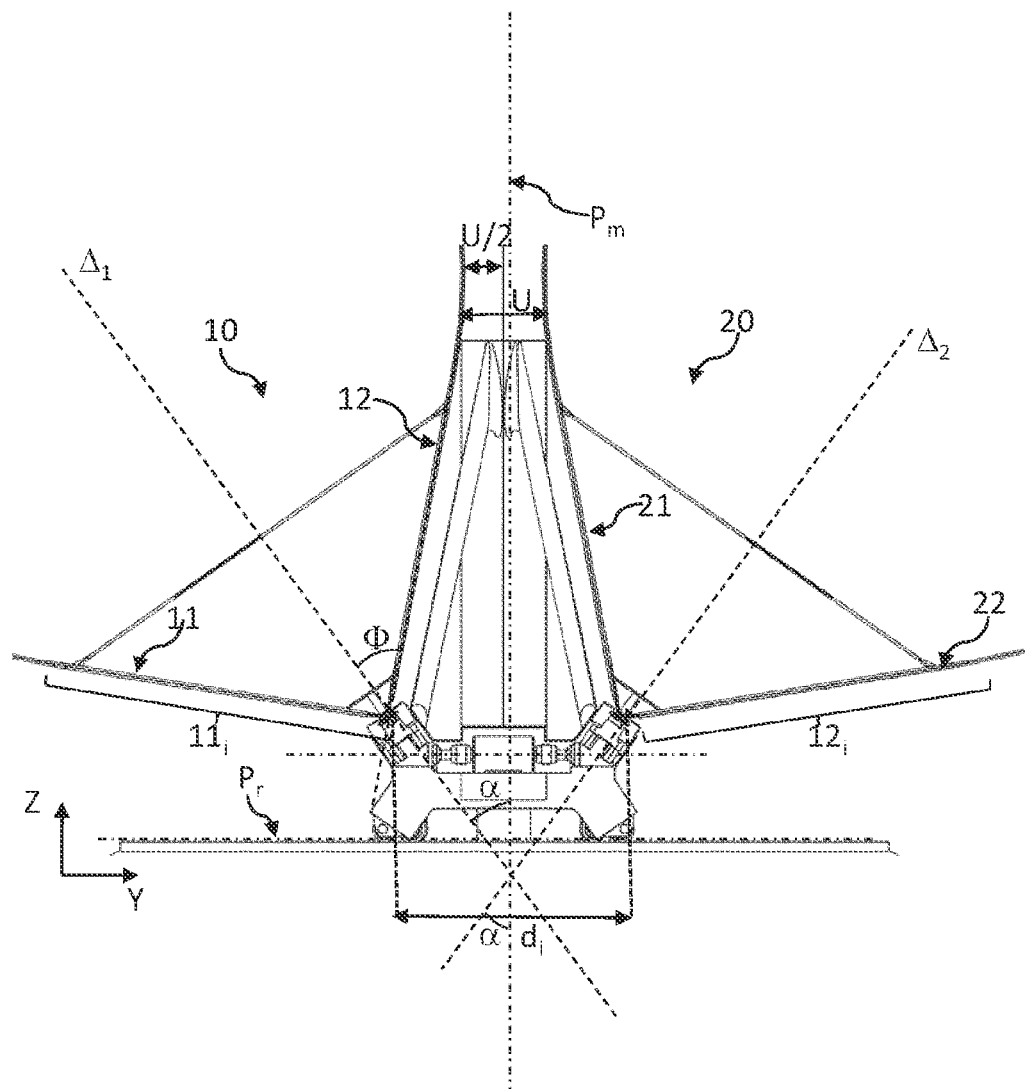
FIG. 2C is a detail of FIG. 2B.

In the example shown, the lower and upper portions of each blade are straight. The lower and upper portions are inclined relative to the first rotation axis at the same lower and upper opening angles. In the example shown, the lower opening angle is equal to the upper opening angle, which is a preferred embodiment. Hereinafter, the lower and upper opening angles are referred to interchangeably as opening angle $\phi$. The opening angle $\phi$ is an acute angle. Where the lower and upper portions of each blade are straight, the radius increases linearly as a function of a distance from the lower end (or upper end), and $\sin(\phi)$. The opening angle $\phi$ is shown in FIGS. 2B and 2C.

Alternatively, the upper opening angle is greater than the lower opening angle. According to this option, the lower opening angle is smaller to save space. The upper opening angle is greater to increase the torque in the upper portion of the blade.

In the example shown, each blade 11, 12 has an equatorial portion $11_e$, $12_e$ extending between the lower portion and the upper portion of the blade. In the example shown, the equatorial portion is curved. Along the equatorial portion $11_e$, from a lower join $11_{ei}$ with the lower portion $11_i$, the radius r of the blade increases gradually to a maximum radius $r_{max}$, then decreases as far as an upper join $11_{es}$ with the upper portion $11_s$. The succession of a straight lower portion, a curved equatorial portion and a straight upper portion is known as a straight-curved-straight (SCS) structure.

An equatorial plane perpendicular to the rotation axis and passing through a point of maximum radius on each blade can be defined. The turbine is preferably symmetrical with respect to the equatorial plane. FIG. 2B shows a line of the equatorial plane $P_{e,1}$ of the first turbine 10. The maximum radius of each blade is then at the midpoint $h_e/2$ of the equatorial portion, the midpoint being determined parallel to the rotation axis. In the example shown, due to the symmetry of each blade with respect to the equatorial plane, the maximum radius of each blade is at the midpoint h/2 of the blade, the midpoint being determined parallel to the rotation axis.

As previously indicated, the shape thus obtained is close to a troposkein curve. When the blade rotates about the rotation axis thereof, the main stresses exerted on the blade are tensile stresses, represented by double arrows along the blade 11 in FIG. 2B. Under the effect of rotation, each blade is held in tension between the upper and lower ends, hence the reference to a troposkein curve. Increasing the angular speed of the blade increases the tension in the blade. As a result, bending stresses, which affect the wind turbines described in the prior art, are reduced in favor of tensile stresses.

The opening angle $\phi$ should be large enough to optimize the surface area covered by each turbine within the rectangular perimeter R described with reference to FIG. 1C. Preferably, the opening angle $\phi$ is between 40° and 50°, for example 45°. This ensures optimum "filling" of each turbine. The filling corresponds to the surface area covered by each turbine relative to the area of the perimeter R.

The turbines 10 and 20 are symmetrical to each other, with respect to the median plane $P_m$. During each rotation, two blades of each turbine approach each other with a minimum gap U, as shown in FIG. 1C and in FIG. 2B. To optimize the filling defined above, it is desirable to minimize the gap U, so as to reduce the free space between the two turbines. However, safety or performance considerations require that the gap U should not be less than a minimum value, notably structural risks, or the excessive influence of one turbine on another, leading to undesirable oscillations. As the opening angle $\phi$ increases, the minimum gap U decreases. If di is a distance between the two lower ends $10_i$, $20_i$ parallel to the lateral axis Y when $\alpha=\phi$, then $U=d_i$. If $\phi>\alpha$, then $U<d_i$, thereby reducing the minimum gap U. The minimum gap U depends on $d_i$, and the angles $\alpha$ and $\phi$. In general terms, it is preferable for: $0.6\phi \leq \alpha \leq \phi$. In the example shown, $\alpha=35°$ and $\phi=45°$, hence $0.78\phi$.

The gap U quantifies the free space between the turbines, which is characterized by the distance between two points $P_u$, referred to as the proximate points, located respectively on the blades of each turbine. The proximate point of a blade of one turbine corresponds to the point closest to a blade of the other turbine, when the two respective blades of each turbine are facing each other. The distance between two respective proximate points of two respective blades of two turbines corresponds to the gap U. Preferably, the proximate point $P_u$ of a turbine is located at the equatorial portion $11_e$ of the turbine. Indeed, the equatorial portion of a blade is understood to be the most productive portion. FIG. 2B shows the proximate points $P_{u,12}$ and $P_{u,21}$ of the blades 12 and 21, respectively.

As used herein, "$r_u$" is the radius of a blade at the proximate point $P_u$. The radius $r_u$ is the distance between the rotation axis and the proximate point, perpendicular to the rotation axis of the blade. FIG. 2B shows the radius $r_u$ of blade 12. The radius $r_u$ is the same for all blades of both turbines.

To optimize filling and increase the performance of the wind turbine 1, it is desirable to minimize the gap U while reducing the distance $d_i$. However, safety considerations require that the gap U should not be less than a minimum value. This is intended to prevent structural problems, in particular as a result of resonance phenomena in the entire holding structure, caused by sudden variations in the wind, or longitudinal oscillations of the blades, caused by local turbulent gusts of wind. According to embodiments of the disclosure, $$0.1 < \frac{U}{2r_u} < 0.2$$

In the example in FIG. 2B, $$\frac{U}{2r_u} = 0.12.$$

The half-gap U/2 corresponds to the closest distance between the blades of a turbine and the median plane $P_m$, as shown in FIG. 2C.

In relation to the opening angle $\phi$ and the angle of inclination $\alpha$, the following disparity must therefore be respected:

$$\alpha < \phi$$

To move away from a configuration in which the axes of the turbines are vertical, which is not optimal in terms of the aforementioned filling, it is preferable that $0.6\phi \leq \alpha$.

In addition to better filling of the rectangular perimeter R, the reduction in the free space between the turbines is accompanied by a blockage of the incident flow on the two sides of the median plane $P_m$. Incident flow refers to the air flow upstream of each turbine. This blockage of the incident flow is thus exploited in a particularly productive part of the blade, at the minimum gap U separating the two equatorial portions of the two blades, as shown in FIG. 2B. It is estimated that bringing the upwind-turning blades of two different turbines closer together increases efficiency by up to 10% compared with an arrangement in which each turbine is isolated from the other.

To increase the efficiency of each turbine, embodiments of the disclosure provide for a height $h_e$ of each equatorial portion $11_e$, $12_e$ of each blade, relative to the height of each blade. Each equatorial portion can thus be characterized by a relative height $\Gamma$, such that $$\Gamma = \frac{h_e}{h}$$

in which:

$h_e$ is the height of the equatorial portion of each blade, parallel to the rotation axis of the blade, and h is the height of each blade, i.e., the distance between the lower end and the upper end, parallel to the rotation axis of the blade.

It is preferable that $\Gamma \geq 0.5$, as described in the publication W. Tjiu, T. Marnoto, S. Mat, M. H. Ruslan, K. Sopian "Darrieus vertical axis wind turbine for power generation I: Assessment of Darrieus VAWT configurations," Renewable Energy 75 (2015) 50-67.

Preferably, $0.5 \leq \Gamma \leq 0.8$. For example, $\Gamma = 0.6$.

The relative height $\Gamma$ defines a relative proportion of the curved equatorial portion of each blade.

A form factor $\delta$ can also be defined for each blade, such that $$\delta = \frac{h}{2r_{max}}$$

in which:

h is the height of each blade parallel to the rotation axis, and $r_{max}$ is the maximum radius of the blade.

When the blade rotates about the rotation axis, the value $2r_{max}$ corresponds to the diameter described by the turbine in the equatorial plane.

It is preferable that $1.3 \leq \delta \leq 1.5$.

Where $\Gamma = 0.6$ and $\phi = 45°$, it can be demonstrated that $\delta = 1.4$ using:

$$\delta = \frac{\sin(2\Phi)}{2}[\sin^2(\Phi) - \Gamma(1 - \cos\Phi)]$$

The form factor $\delta$ increases with $\Gamma$. Where $\Gamma$ is constant, the form factor decreases as $\phi$ increases, because as $\phi$ increases, so does $r_{max}$.

A form factor $\Lambda$ can be defined for the wind turbine 1, such that:

$$\Lambda = \frac{I}{2r_{max}}$$

This form factor is a ratio between the minimum gap U between two blades of two different turbines and twice the maximum radius defined by each blade. It is preferable that $0.05 \leq \Lambda \leq 0.3$ or $0.1 \leq \Lambda \leq 0.3$. In the example shown, $\Lambda = 0.12$.

It is understood from the foregoing that the geometry of each blade results from an optimization of the relative height $\Gamma$ of the equatorial portion $$\left(\text{ratio } \frac{h_e}{h}\right),$$

a form factor $\delta$ of each blade $$\left(\text{ratio } \frac{h}{2r_{max}}\right),$$

and a form factor Λ of the wind turbine 1

$$\left(\text{ratio } \frac{U}{2r_{max}}\right)$$

so as to optimize the efficiency of the wind turbine 1.

Description of the Holding Structure:

The wind turbine 1 comprises a holding structure 50 to support the blades described above. As shown in FIGS. 1A to 1C, the holding structure extends from a nacelle 40, supporting the generator 30. In the embodiment shown in FIGS. 1A to 1C, the nacelle 40 is movable in rotation about a static support 60. The support 60 is arranged at the top of a pillar 61.

The pillar 61 extends vertically from a base on which the wind turbine 1 rests. The base can be arranged on the ground. The base can also be installed at sea on a floating barge. In shallow waters, the base can be connected to the seabed. The pillar 61 allows the turbines 10, 20 to be arranged above a boundary layer, as described in the prior art. Boundary layer means a layer extending from the base in which the wind is not uniform, and may be subject to irregularities due to the topography surrounding the base. The boundary layer is liable to turbulence, which can lead to fatigue. The pillar 61 enables the turbines 10, 20 to be raised above the boundary layer. The turbines are thus exposed to more uniform wind. In marine applications, for which a wind turbine 1 according to embodiments of the disclosure is particularly suitable, the height of the pillar 61 can be between 5 m and 50 m. The use of a tapered turbine shape, as described above, helps to raise the equatorial portion, which is the most productive portion, above the boundary layer, while limiting the height of the pillar 61. The specific shape of the turbines helps to reduce the height of the pillar 61, and of the wind turbine 1 components located about the nacelle 40. This means that maintenance operations requiring access to the base or to the nacelle located on the base are not carried out at significant height. The risk of the wind turbine 1 tipping over is also reduced. The proposed structure can thus harness winds above the boundary layer, without the need for a very high pillar.

The holding structure 50 comprises a mast $50_i$ extending vertically from the nacelle 40. The median plane $P_m$ forms a plane of symmetry of the mast and, more generally, of the entire holding structure. Along a horizontal longitudinal axis X parallel to the median plane, the mast $50_i$ is set back by a setback distance d from the downstream plane $P_a$. The mast is then located upstream of the downstream plane $P_a$ in consideration of the wind direction. The setback distance d is adjusted to allow each blade to pass close to the mast $50_i$, so as to form a deflector effect, as described below. The setback distance can be between 0.75 $r_{max}$ and 1.25 times $r_{max}$.

The holding structure 50 comprises an upper portion $50_s$ formed by:

a first upper arm 51 extending from the mast $50_i$ to a first upper support $51_s$ adjacent to the upper end $10_s$ of the first turbine 10, and a second upper arm 52 extending from the mast $50_i$ to a second upper support $52_s$ adjacent to the upper end $20_s$ of the second turbine 20.

Figure 3A:
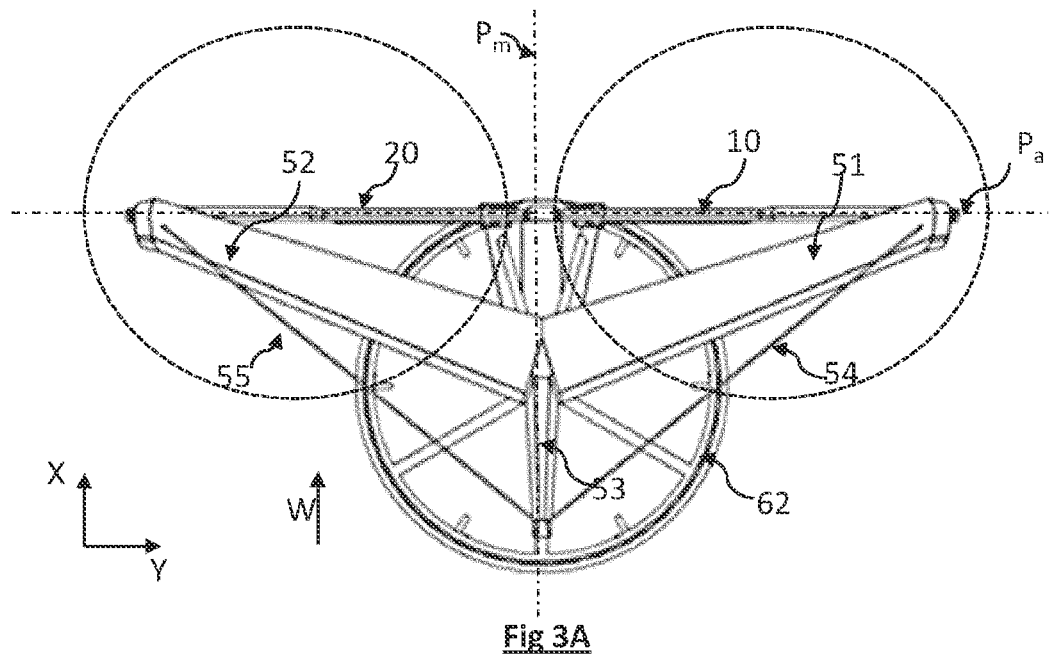
FIG. 3A is a top view of the wind turbine described with reference to the preceding figures.

FIG. 3A is a top view of the wind turbine 1. As shown, the distance between the holding structure 50 and the downstream plane $P_a$ varies between the different components of the holding structure: the distance between the vertical mast 50, and the downstream plane $P_a$ is constant and equal to the setback distance d described above. The distance between each upper arm 51, 52 and the downstream plane $P_a$ decreases closer to the upper supports $51_s$ and $52_s$. FIG. 3A shows a wind direction W and a displacement of each turbine in dotted lines. The wind turbine 1 is arranged so that the mast 50, is located upstream of each turbine, the term "upstream" being understood relative to the wind direction. Since the longitudinal axis X is oriented from the mast 50, towards the downstream plane, the upper arms extend along both the vertical axis Z and the axis X. The upper arms move closer to the downstream plane $P_a$, which contains the upper ends $10_s$ and $20_s$ of each turbine, as the arms extend along the axis Z.

The mast $50_i$ is connected to a king post 53, which is inclined in relation to the vertical axis and extends from the mast 50, away from the downstream plane $P_a$. The inclination of the king post 53 with respect to the vertical axis is thus opposite to the respective inclinations of the upper arms 51 and 52 with respect to the vertical. The holding structure comprises:

a first brace 54 extending between the king post 53 and the first upper support $51_s$, and a second brace 55 extending between the king post 53 and the second upper support $52_s$.

The first upper arm 51 extends as far as the first upper support $51_s$. The first upper support $51_s$ is arranged to receive a first upper shaft $A_{s,1}$ coaxial with the first rotation axis $\Delta_1$ and connected to the first upper end $11_s$ of the first turbine 10. Similarly, the second upper arm 52 extends as far as the second upper support $52_s$. The second upper support $52_s$ is arranged to receive a second upper shaft $A_{s,2}$ coaxial with the second rotation axis $\Delta_2$ and connected to the second upper end $21_s$ of the second turbine 20. "Upper shaft" means a rotating mechanical element having an upper end and connecting the upper end and the upper support. Each upper arm 51, 52 extends on the two sides of the median plane $P_m$ from the mast $50_i$. The holding structure formed by the mast, braces and struts described below is symmetrical with respect to the median plane $P_m$.

The first upper support $51_s$ and the second upper support $52_s$ form a pivot link between the holding structure 50 and the first turbine 10 and the second turbine 20, respectively. The lower ends of each turbine are connected to the nacelle 40 by a pivot link. This pivot link transmits the rotation of each turbine to the generator 30, as described below. The upper supports $51_s$, $52_s$ form a pivot link that leaves the upper shafts $A_{s,1}$, $A_{s,2}$ free to rotate. The fact that a blade is held at each end (upper and lower) by a pivot link maintains a certain rigidity, and prevents the blades from deforming when subjected to tension under the effect of rotation. Each upper support has ball or roller bearings 56 enabling rotation of an upper shaft ($A_{s,1}$ or $A_{s,2}$) about the rotation axis ($\Delta_1$ or $\Delta_2$) inside each upper support.

Figure 3B:
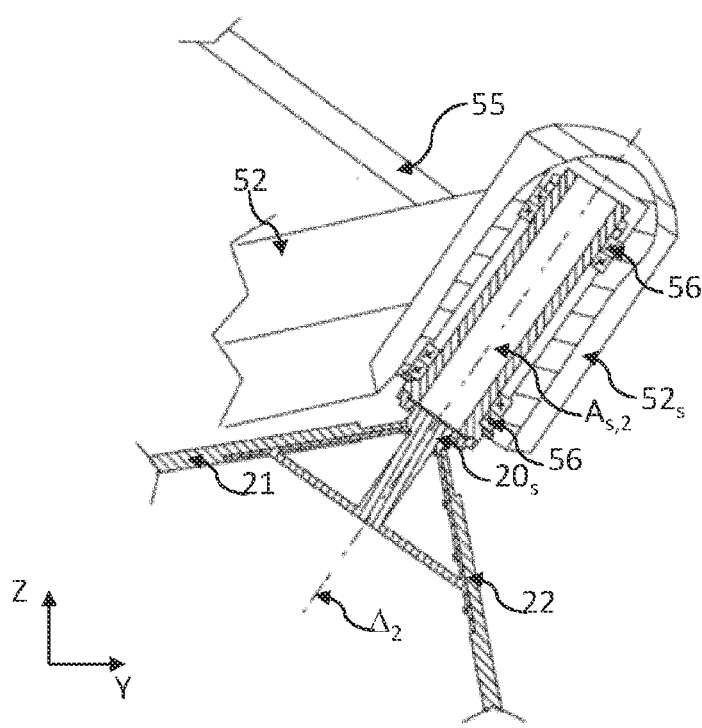
FIGS. 3B and 3C show an upper support structure of a wind turbine.

FIG. 3B is a cross-section view of the second upper support $51_s$. This figure shows the second rotation axis $\Delta_2$ and the second upper rotary shaft $A_{S,2}$, the latter providing a mechanical link between the second turbine 20 and the second upper support $52_s$. The second upper support $52_s$ comprises annular bearings 56 extending about the rotation axis $\Delta_2$, and enabling rotation of the shaft $A_{s,2}$ inserted in the upper support $20_s$.

Figure 3C:
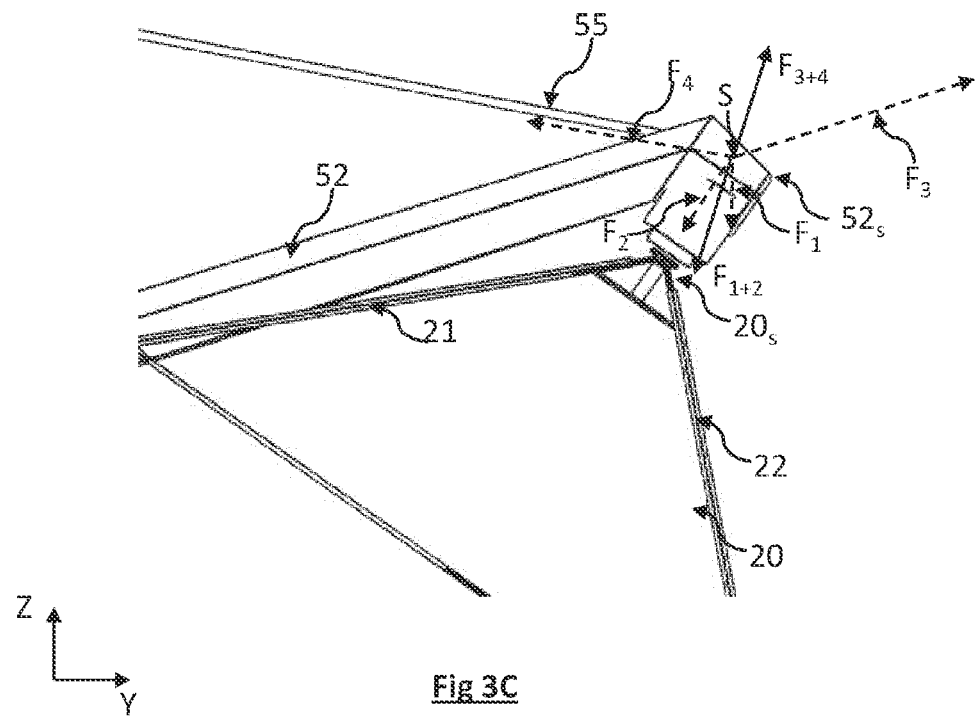

Each upper arm 51, 52 acts as a pylon between a brace 54, 55 connected to the king post 53 and a turbine 10, 20, the turbine being held in tension between an upper support $51_s$, $52_s$ and the nacelle 40. In a vertical plane, as shown in FIG. 3C, the forces exerted on each upper support $51_s$, $52_s$ are gravitational and centrifugal. FIG. 3C shows the forces in a vertical plane YZ acting on a point S of the second upper support $52_s$. The force $F_1$ is gravity, oriented vertically, and the force $F_2$ is a centrifugal force, directed along the rotation axis $\Delta_2$. The centrifugal force results from the traction exerted by the turbine under the effect of rotation. When the turbine 20 rotates, the blades 21, 22 tend to move away from each other by centrifugal force, generating the resultant force $F_2$ in the upper support $52_s$. The force $F_3$ is the compression strength of the upper arm 52. The force $F_4$ is a tensile force resulting from the tension exerted by the brace 55. FIG. 3B shows the forces $F_1$ to $F_4$, and the resultant forces:

$F_{1+2}=F_1+F_2$: these are the tensile forces exerted by the turbine, and $F_{3+4}=F_3+F_4$: these are the forces exerted by the holding structure: upper arm 52 and brace 55.

The upper arm 52 thus acts as a pylon with two braces extending from both sides: the actual brace 55 and the turbine 20, which behaves in a similar way to a brace, exerting a tensile stress on the upper arm during rotation. The result is a triangulation of forces, leading to the upper arm 52 being subjected to a compression force, under the effect of the tension of the brace and the turbine. This type of structure, comparable to a suspension bridge, is particularly robust. The situation is naturally symmetrical for the first upper support $51_s$, which is connected to the brace 54 and the first turbine 10, acting as a brace during rotation. This type of triangular mesh facilitates the triangulation of forces, favors tensile/compressive stresses, and minimizes bending stresses.

In the horizontal plane XY, the forces acting on the holding structure are the result of thrust forces. Balance is ensured by the "V" shapes opening downstream (i.e., axis X), formed respectively by the braces 54, 55 extending from the king post 53 and the two upper arms 51 and 52. In the horizontal plane, the upper arms 51, 52 and the king post 53 have a compressive strength action similar to a pylon. Each is connected to two braces exerting a tensile action that can be considered symmetrical on the two sides of each pylon thus formed. Various triangular meshes are used to triangulate forces, in particular:

the king post 53, connected to the braces 54, 55, the second upper arm 52 connected to the brace 55 and to the second turbine 20, which exerts a tractive force, as described with reference to FIG. 3B, and the first upper arm 51 connected to the brace 54 and to the first turbine 10, which exerts a tractive force similar to the turbine 20.

Figure 3D:
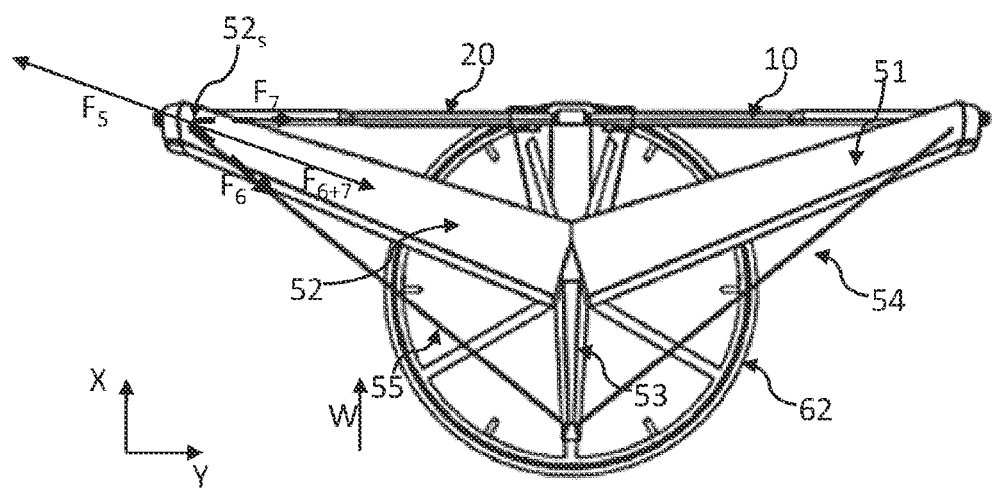
FIG. 3D is similar to FIG. 3A.

FIG. 3D shows a triangulation of the forces acting in the horizontal plane on the upper support $52_s$: The forces $F_5$, $F_6$ and $F_7$ correspond respectively to the compressive strength exerted by the upper arm 52, the traction exerted by the brace 55, and the traction exerted by the turbine 20 under the effect of rotation, and more precisely the horizontal component of the centrifugal force exerted on each blade. The force $F_{6+7}$ is the sum of $F_6+F_7$.

FIG. 1C, drawn in a vertical plane YZ parallel to the downstream plane $P_a$, shows another triangular mesh formed by the brace 54, the king post 53 and the upper arm 51. The king post 53 and the upper arm 51 are held in compression by the brace 54, which is subjected to tensile stress. The formation of bending stresses is again minimized. Symmetrically, the brace 55, the king post 53 and the upper arm 52 form another triangular mesh.

The holding structure of the wind turbine 1 also includes struts 41 having an anti-tilting, stiffening effect. Two struts 41 extend from the mast 50, towards the nacelle 40 supporting the generator 30. The struts are arranged in a V-shape, opening as the struts approach the nacelle 40. The objective is to reduce the bending force exerted on the mast $50_i$, as the struts are subjected to compressive stress under the effect of the thrust exerted on each turbine, parallel to the wind direction. The only portion of the holding structure subject to bending stress is the portion of the mast extending between the struts 41 and the upper arms 51, 52.

The V-shape, in which the struts move away from each other on the two sides of the longitudinal axis X as the struts approach the nacelle 40, has an anti-roll effect. Thus, the struts 41 have an anti-tilting function (rotation in the median plane $P_m$ about the axis Y) and an anti-roll function (rotation in a plane perpendicular to the median plane $P_m$, about the axis X) for the wind turbine 1. The use of struts 41 is made possible by the fact that the mast $50_i$ is located upstream of the turbines. The location of the mast $50_i$ upstream of the turbines thus reduces the bending stress applied to the latter, enabling the use of struts.

The arrangement of the struts 41 and, in particular, the inclination of each strut with respect to the longitudinal axis X, is designed to enable rotation of the blades.

As shown in FIGS. 1A to 1C, the nacelle 40 can be freely rotated relative to the support 60 about a vertical rotation axis O, about which the mast $50_i$ extends. The nacelle 40 allows rotation of the assembly formed by the holding structure 50, the turbines and the generator 30 about the vertical rotation axis O. The vertical axis O is shown in FIG. 1B. In FIG. 3A, the rotation axis O corresponds to the center of the rolling path 62.

Since the wind turbine 1 is symmetrical with respect to the median plane $P_m$, the rotation of the nacelle enables the wind turbine 1 to be self-adjusting with respect to the wind direction. Forces are applied to each turbine by the wind to move the turbines in front of the mast, so that the downstream plane $P_a$ tends to be passively oriented perpendicular to the wind direction W. "Passively" means without the need for electrical slave control. This is known as passive yaw orientation. With such orientation, the thrust forces exerted respectively by each turbine along the longitudinal axis X are symmetrical and balanced on account of the symmetry of the whole with respect to the median plane $P_m$. If the wind direction changes, the thrust forces become unbalanced, which leads to the wind turbine 1 self-adjusting so that the thrust forces are balanced: the orientation of the wind turbine 1 is self-adjusting, so that the downstream plane $P_a$ is always oriented perpendicular to the wind. Self-adjustment results from the symmetry of the wind turbine 1 with respect to the median plane. In the example shown in FIGS. 1A to 1C, the nacelle is movable in rotation on rollers 41 along a circular rolling path 62 on the static support 60. The rolling path 62 and the orientation of the mast in relation to the downstream plane are shown in FIG. 3A. The rolling path extends along a horizontal running surface $P_r$. The running surface is shown in FIGS. 1B and 2C.

Alternatively, the nacelle 40 can be static relative to the support 60. In this case, the orientation of the mast and the turbines is predetermined according to the most frequent wind direction. This configuration is suitable for marine applications, where a prevailing wind direction can be determined. The contact between the nacelle and the support can then take the form of embedding.

Regardless of the configuration chosen (static or movable in rotation), the mast is located upstream of the blades, the term "upstream" referring to the wind direction.

The setback distance d of the mast $50_i$ from the downstream plane $P_a$ can be optimized. The radius $r_{max}$ of each blade must be reduced proportionately as the distance d is reduced, to enable the blade to rotate between the rotation axis and behind the mast $50_i$. Decreasing $r_{max}$ reduces the frontal area of the wind turbine 1. The radius $r_{max}$ can be increased proportionally as the setback distance d increases, at the expense of greater roll sensitivity and a larger footprint. According to embodiments of the disclosure, the ratio $d/r_{max}$ should preferably be between 0.4 and 0.6, for example close to 0.5.

Figure 4:
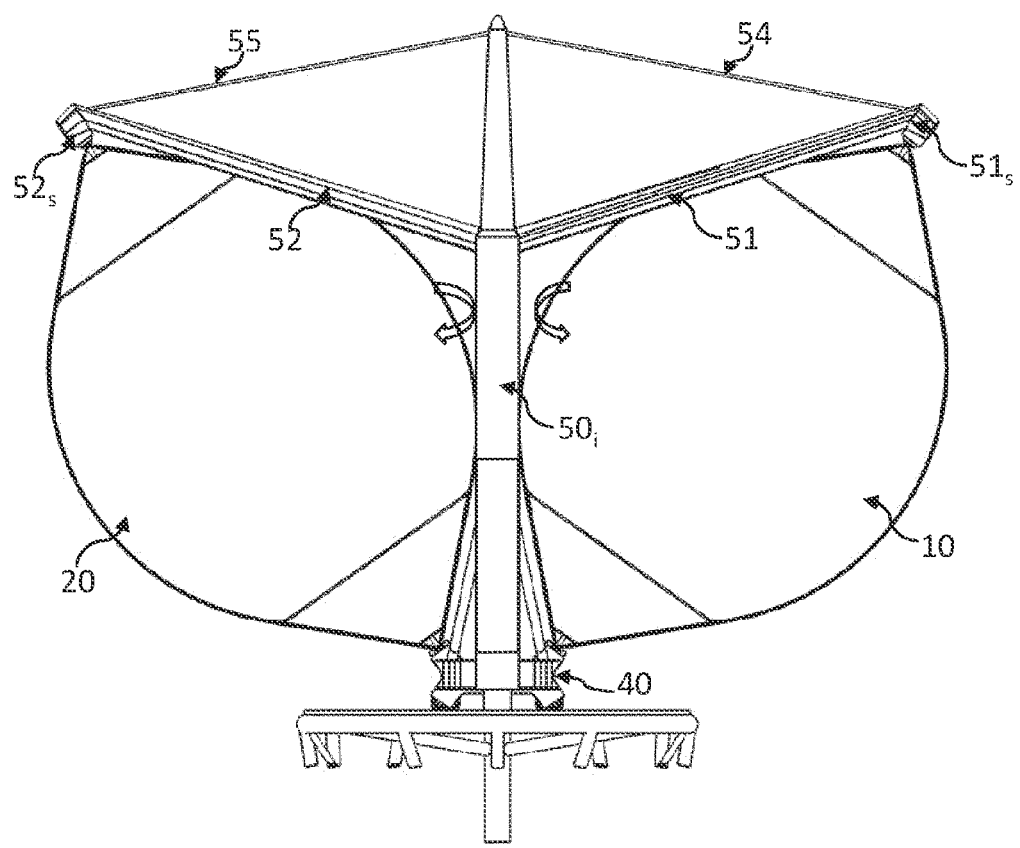
FIG. 4 is an upstream view of the wind turbine described in the preceding figures.

In addition to reducing bending stresses and enabling passive yaw orientation, another advantage of positioning the mast $50_i$ upstream of each turbine is the masking effect that the mast can have on the blades. This beneficial effect occurs, for example, when the blades are arranged to turn upwind along the trajectory closest to the mast (upwind mode). This masking effect can be provided by the mast $50_i$, but also by a portion of the upper arms, as shown in FIG. 4. FIG. 4 is an upstream view of the wind turbine 1. The mast $50_i$ can be dimensioned to mask the wind affecting a portion of the equatorial portion of each blade. The upper arms 51 and 52 can also contribute to the masking effect. The masking effect occurs when a blade is moving upwind close to the arm, in a zone in which the blade is not driving, i.e., in which the blade is not considered to be productive. The masking effect thus helps to increase the efficiency of the wind turbine 1.

Figure 5A:
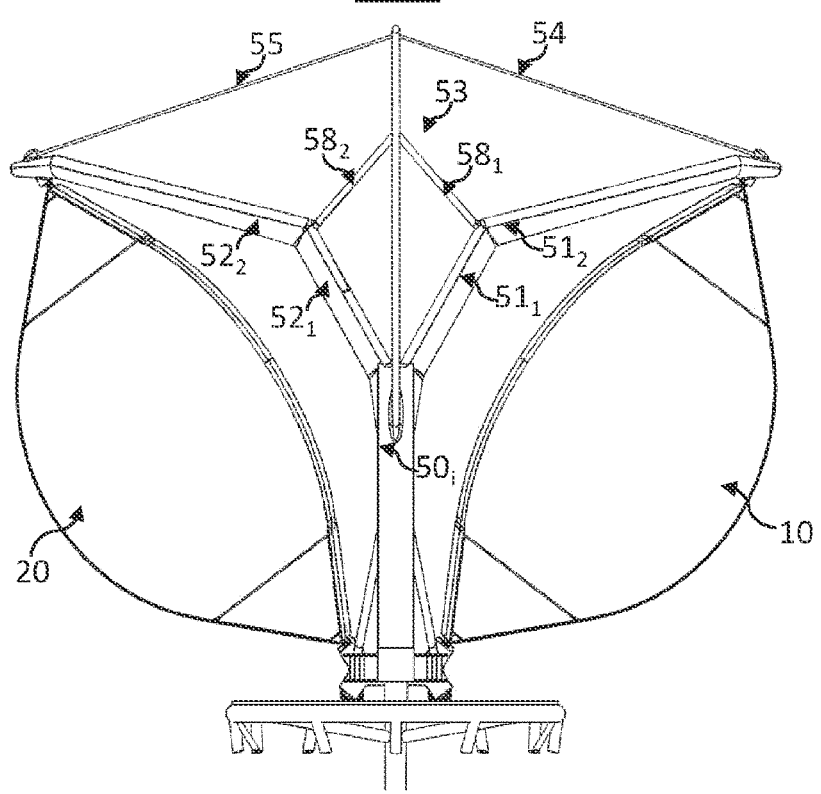
FIG. 5A shows a wind turbine configuration in which each turbine has three blades.

The masking effect can be enhanced in the configuration shown in FIG. 5A, in which each upper arm comprises a succession of elementary arms. Thus, the first upper arm 51 comprises a first elementary arm $51_1$ extending from the mast $50_i$, and a second elementary arm $51_2$ extending between the first elementary arm $51_1$ and the upper support $51_s$. The second upper arm 52 comprises similarly arranged elementary arms $52_1$ and $52_2$. The inclination of each elementary arm to the vertical increases as the elementary arm moves away from the mast $50_i$.

The use of elementary arms also increases the rigidity of the holding structure. This also prevents buckling in the upper arms. The holding structure may comprise stiffening struts $58_1$, $58_2$ extending from the king post 53 towards each join between two successive elementary arms. The stiffening struts are arranged to form triangular meshes, which encourages tensile/compressive stressing. Alternatively, there can be more than two successive elementary arms.

The beneficial effect of the mast, in both upwind and downwind modes, is described in detail in the variants discussed with reference to FIGS. 5E and 5F.

Figure 5B:
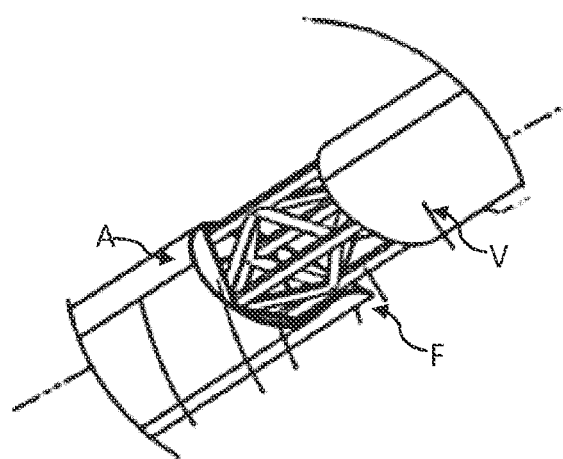
FIGS. 5B and 5C show a possible profile of the arms forming the holding structure of the wind turbine.

Arm Profile:

Preferably, each of the upper arms 51 and 52 has a vertical cross-section with the same profile as a low-dihedral wing, as shown in FIG. 4 and FIGS. 5A and 5B. FIG. 5A shows a specific airfoil shape of the elementary upper arms, which are made up of wing segments. The shaped section has a leading edge A, visible in FIG. 5B, and a trailing edge F, opposite the leading edge. The leading and trailing edges are connected to each other by a lateral wing surface V.

Figure 5C:
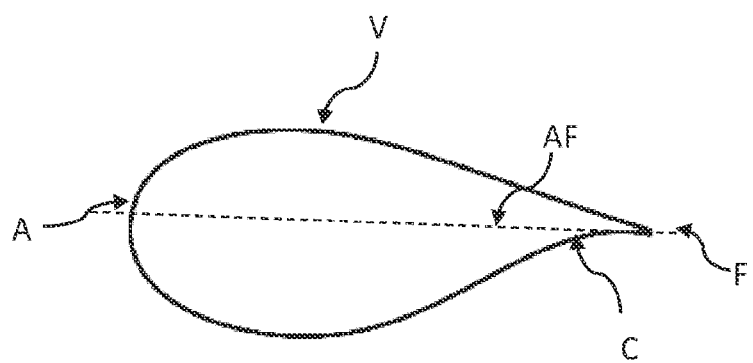

The profile of these arms is conventionally defined by the vertical cross-section thereof in a plane parallel both to the median plane $P_m$ and to the wind direction W. These profiles are known as thick wing profiles, with a convex upper surface and an equally convex lower surface, but with a local concavity towards the trailing edge. In FIG. 5C, the local concavity of the lower surface is shown by a symbol C. The main function thereof is to contribute to the structural support of the turbines against the wind. The profile can be characterized by a relative thickness, defined as the ratio between the maximum thickness of the profile and the chordal length of the profile. The relative thickness can notably be close to 0.5, to ensure high structural strength. However, this relative thickness should be closer to 0.35 to obtain a high (and therefore favorable) lift-to-drag ratio: lift reduces the compressive force applied to the mast $50_i$, and then to the nacelle 40 via the struts 41, while drag produces unwanted tilting torque. A compromise value is to position the thick-wing profile so that the angle of attack is in the lower range of the critical angle of attack, i.e., a value between 10° and 20°, for example 15°.

The angle of attack is the angle relative to the horizontal formed by a straight line AF connecting the leading edge to the trailing edge, usually referred to as the "chord line."

The arms 51 and 52 thus defined to provide lift offer a third advantage. The arms can be likened to a pair of wings emitting an air flow towards the ground to create lift. A fraction of this air flow is emitted close to the upper supports $51_s$ and $52_s$. In this zone, the turbines are impacted along the straight upper portions, which are not very productive, with no appreciable effect. The air flow then moves along the trailing edge of the arms towards the equatorial portion and more productive parts of the blades.

Such a structure can help straighten the wind perpendicular to the downstream plane $P_a$ and increase the intensity of the wind hitting the turbines. This straightening requires specific positioning of the straight line AF, linking the leading edge A and the trailing edge F, depending on whether the turbines are in turning in the downwind or upwind direction. The literature on Darrieus turbines with isolated straight blades and efficiency-enhancing deflectors shows that, in the upwind direction, the angle of attack of the airfoil shape must be such that the straight line AF preferably intersects the path of the blade after the blade has traveled approximately two-thirds of the upwind trajectory. In the downwind direction, the angle of attack of the airfoil shape must be such that the straight line AF intersects the path of the blade after the blade has traveled halfway along the downwind trajectory.

Furthermore, under certain conditions, the airfoil shape gives the upper arms a degree of lift, tending to lighten the holding structure under the effect of the wind. This reduces the compressive force applied by the mast $50_i$ to the nacelle 40, via the struts 41.

In general, according to the variants discussed with reference to FIGS. 5A to 5D, each arm has a shaped vertical section extending between a leading edge and a trailing edge, the trailing edge being oriented towards the downstream plane $P_a$. The line connecting the leading edge and the trailing edge can advantageously be inclined in relation to the horizontal at an angle of attack of between 10° and 20°.

Figure 5D:
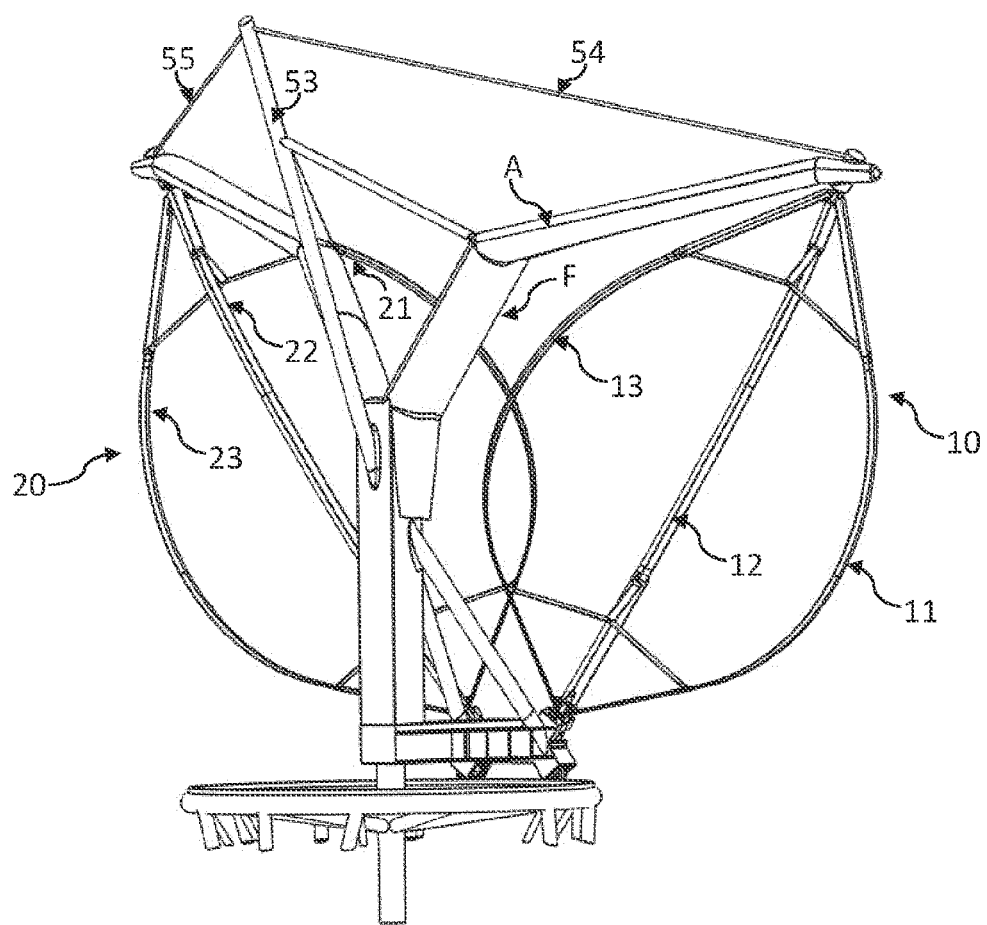
FIG. 5D is another representation of the wind turbine shown in FIG. 5A.

In FIG. 5A, each turbine has three blades, angularly spaced apart from one another by 120°. Such a configuration is also shown in FIG. 5D: the first turbine 10 has three blades 11, 12, 13. The second turbine 20 has three blades 21, 22, 23. According to embodiments of the disclosure, the turbine preferably has either two blades angularly spaced apart at 180°, or three blades angularly spaced apart at 120°. Increasing the number of blades beyond three is not considered to be beneficial.

Figure 5E:
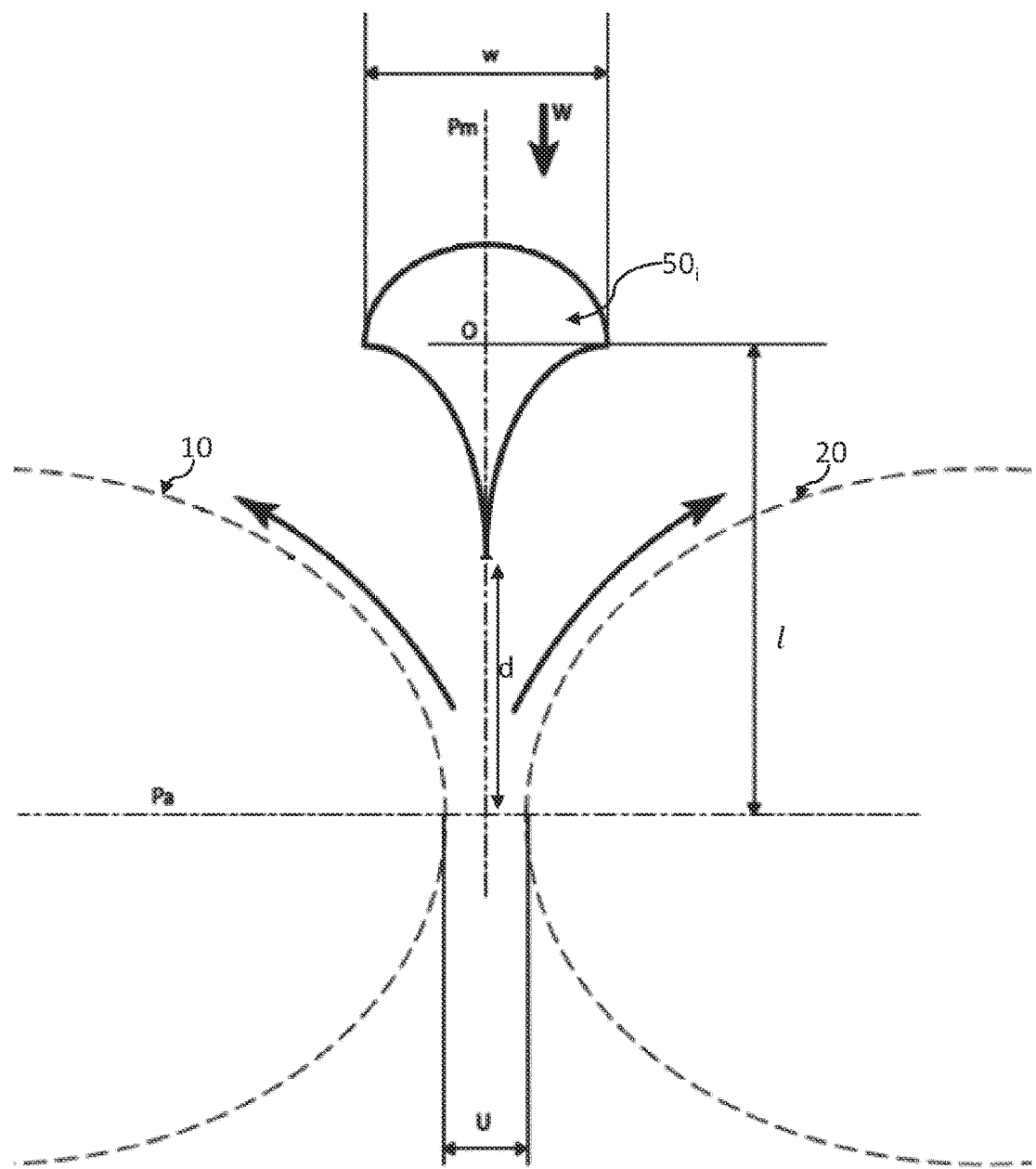
FIGS. 5E and 5F show variants in which the mast has a horizontal section suitable for operation in an upwind mode (FIG. 5E) or a downwind mode (FIG. 5F).
Figure 5F:
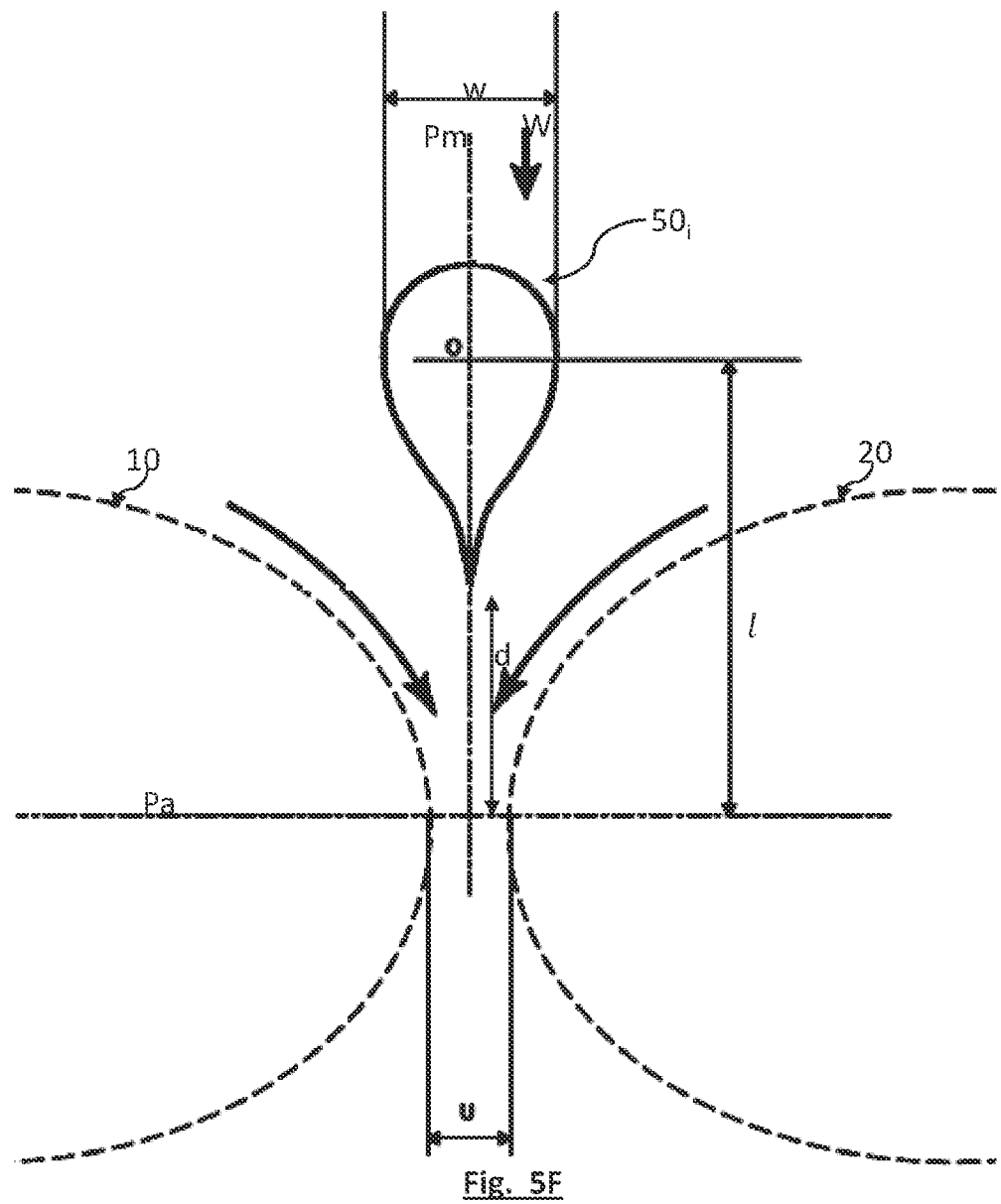

Mast Profile:

FIGS. 5E and 5F show variants in which the mast 50, has a horizontal cross-section with optimized profiles. According to these variants, the mast extends about a central axis O. Where the mast is movable in rotation, the central axis O is the rotation axis. The central axis O is positioned at a distance l from the downstream plane $P_a$. The mast is then located upstream of the downstream plane $P_a$ in consideration of the wind direction. The mast extends perpendicularly to the median plane $P_m$, along a width w. The distance between the central axis O and the downstream plane is l. The distance l and width w, as well as the shape of the section of the mast in a plane perpendicular to the axis O (horizontal plane) can be adjusted depending on whether the turbines are set up in the upwind or downwind direction, to enable the masts to have a positive effect on turbine performance, as described below:

In the upwind direction, in addition to supporting the holding structure 50, the mast 50, can act as an aerodynamic deflector as described in the publication Jin X, Wang Y, Ju W, He J, Xie S, "Investigation into parameter influence of upstream deflector on vertical axis wind turbines output power via three-dimensional CFD simulation," Renew. Energ., 2018, 115:41-53. The deflector in this study combines two positive effects to increase performance:
- a braking effect in the inter-turbine zone, resulting from the pressure drop downstream of the deflector, which is subjected to a high pressure drag, and
- a straightening effect of the incident flow on the blades, resulting in an increase in the driving force thereof. The straightening effect is felt in the upstream half-ellipse swept by the blades in the sector between the most upstream point of this half-disk and the inter-turbine zone, i.e., the area between the two turbines.

The minimum width of the inter-turbine zone (perpendicular to the median plane $P_m$) is the gap U mentioned above. The results of this publication, transposed for application to a Darrieus turbine with curved blades, show that the ratio $w/2r_u=0.33$ constitutes an upper limit of permissible widths, the lower limit according to embodiments of the disclosure being 0.25.

$$0.25<w/2r_u<0.33$$

Secondly, the ratio $l/2r_u=0.7$ constitutes an upper limit of permissible widths, the lower limit according to embodiments of the disclosure being 0.6.

$$0.6<l/2r_u<0.7$$

If the aerodynamic deflector effect can simply be obtained by a plate parallel to the downstream plane $P_a$ of width w positioned at a distance l from the downstream plane $P_a$, the constraints imposed by the lifting function of the mast and the need to allow the turbine blades to pass on the two sides, suggest the use of a two-dimensional T-beam or triangular box section. In other words, it is preferable for the horizontal section of the mast to have a component extending parallel to the downstream plane $P_a$ and forming a deflector, as well as a component downstream of the deflector extending perpendicular to the downstream plane $P_a$ to straighten the air flow downstream of the deflector. The term "straightening" means tending towards the direction of incident flow upstream of the deflector. FIG. 5E shows an embodiment of such an optimized cross-section for turbines turning in the upwind direction. In this figure, the horizontal section of the mast extends from a convex upstream end exposed to the wind, and a downstream end. Between the upstream end and the downstream end, the horizontal section of the mast is formed by two concave portions that are symmetrical to each other in relation to the median plane. The concavities in the downstream end have a braking effect on the flow previously straightened by the upstream end.

FIG. 5F shows an embodiment of such an optimized cross-section for turbines operating in the downwind direction. In the downwind direction, in addition to supporting the holding structure 50, the mast $50_i$ can play a positive role in straightening the incident flow in the inter-turbine zone. Indeed, in the downwind direction, the inter-turbine zone is subject to significant vortex separation. Advantageously, the mast has a thick profile, with a convex upstream end, symmetrical along the median plane $P_m$, with low drag, the aerodynamic center of which lies on the rotation axis O, and the thickness w of which is such that:

$$0.15<w/2r_u<0.25$$

The aerodynamic center of the mast is located at a distance l upstream from the plane $P_a$ such that:

$$0.6<l/2r_u<0.7$$

The term "aerodynamic center" is a known concept in the field of wings.

In general, the mast advantageously has a horizontal section extending parallel to the median plane $P_m$ between a convex upstream end and a downstream end, approaching the downstream plane $P_a$. Preferably, the horizontal section of the mast is tapered between the upstream end and the downstream end. Preferably, the horizontal cross-section of the mast is symmetrical with respect to the median plane $P_m$. Where the turbines are designed to turn in the upwind direction, the horizontal section of the mast has two concave sections between the upstream end and the downstream end, arranged symmetrically in relation to the median plane.

Figure 6A:
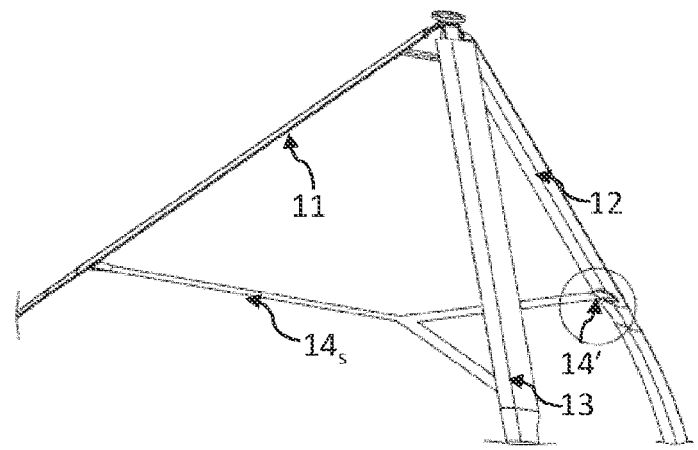
FIG. 6A shows a crosspiece designed for a turbine with three blades per turbine.
Figure 6B:
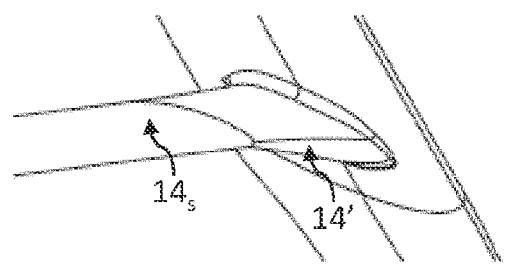
FIG. 6B is a detail of FIG. 6A.
Figure 6C:
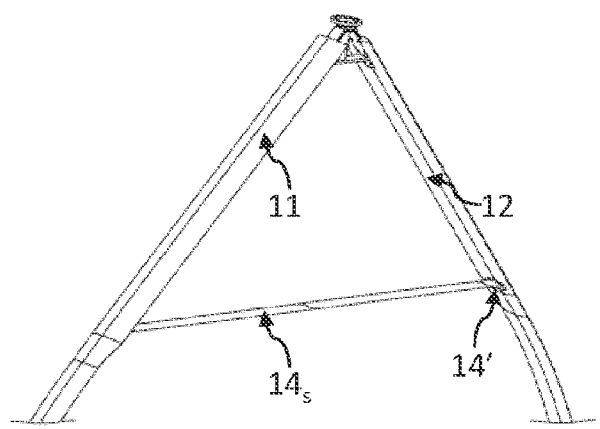
FIG. 6C shows a crosspiece designed for a turbine with two blades per turbine.

Crosspieces:

FIGS. 6A and 6C show rigid, shaped crosspieces suitable for three-blade and two-blade turbines, respectively, As previously mentioned, the crosspieces extend perpendicular to the rotation axis, and help to stiffen each turbine. These crosspieces are shaped to reduce drag. The crosspiece shown in FIG. 3A has three legs, extending 120° from a center positioned on the rotation axis. Each crosspiece can be arranged between two respective straight portions of different blades, or close to the joins between the straight portion and the equatorial portion of different blades. Although inclusion of a crosspiece is particularly advantageous in terms of rigidity in the equatorial plane, it also causes turbulence, which is a source of energy dissipation. It is preferable to use an upper crosspiece and a lower crosspiece that are positioned closer to one end of a turbine (upper and lower end respectively) than to the equatorial plane.

Each crosspiece has a symmetrical aerodynamic profile with respect to a plane perpendicular to the rotation axis of the turbine. The join of each crosspiece with a blade can be optimized to form a fillet 14', as shown in FIG. 6C. The fillet can define a radius decreasing from the leading edge to the trailing edge of the blade.

Figure 6D:
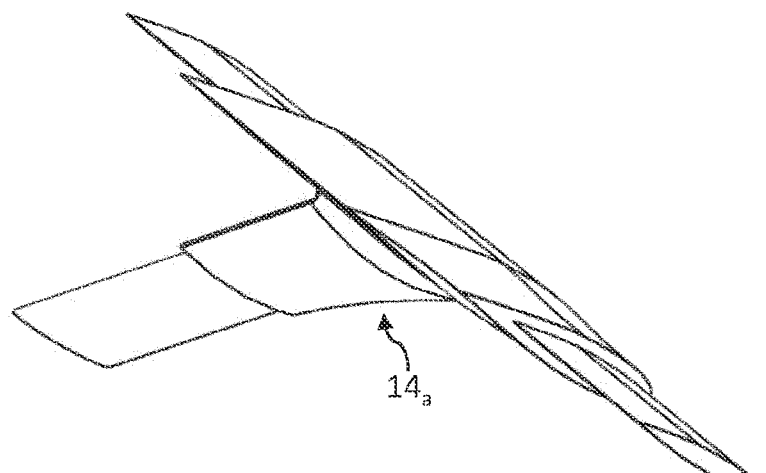
FIGS. 6D and 6E show the use of an interface part used to assemble a crosspiece with a blade.
Figure 6E:
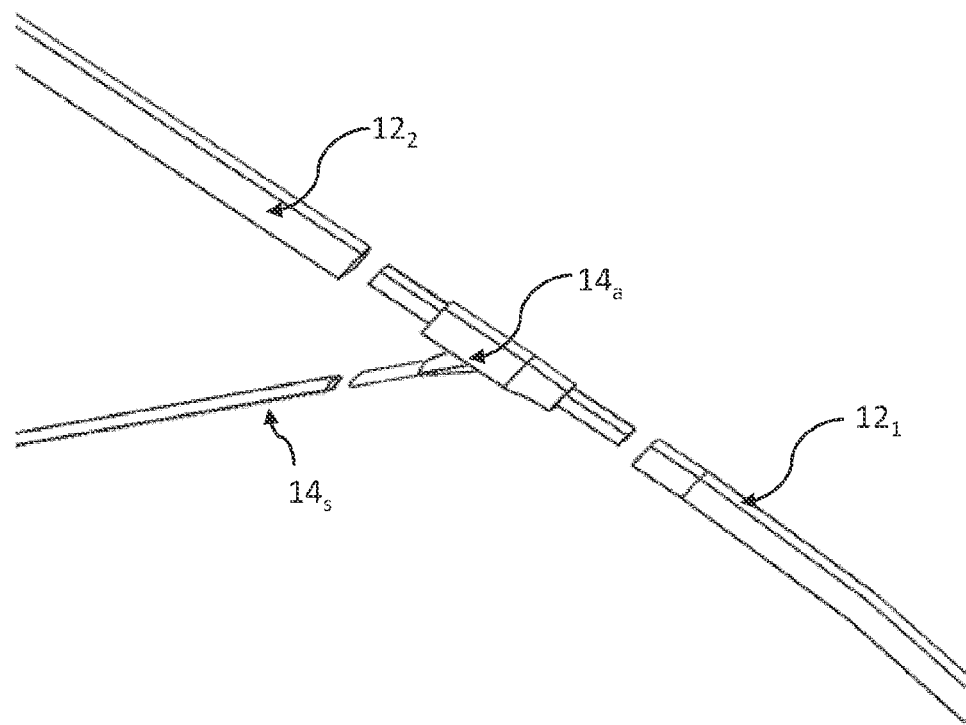

FIG. 6D shows an interface part $14_a$ connecting a crosspiece, in this case the upper crosspiece $14_s$, to a blade, in this case the blade 12. The interface part forms a T with three ends. The interface part is designed to be inserted in or about the crosspiece $14_s$, as well as in or about two portions of the blade $12_1$, $12_2$. The interface part is designed to continue the curvature of the blade between the two blade portions $12_1$, $12_2$, see FIG. 6E. The interface part engages in or about the crosspiece or each portion of the blade along a fitting length.

This allows forces to be distributed along the fitting length. This limits the appearance of fatigue effects at the join.

Figure 7A:
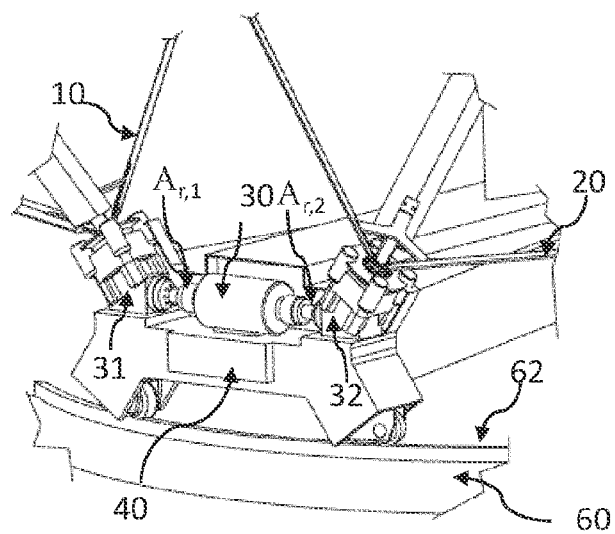
FIGS. 7A and 7B show the mechanical transmission between each blade and the generator.
Figure 7B:
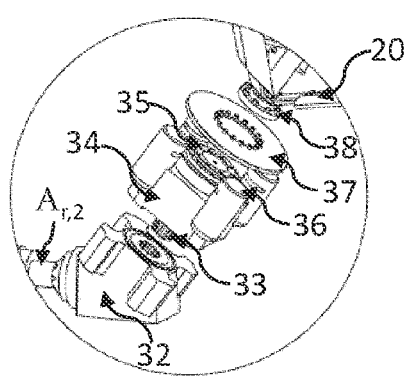

Electromechanical Transmission Chain:

FIGS. 7A and 7B show the electromechanical transmission chain of the wind turbine 1, which drives the generator. At each lower end, each turbine is connected to a lower rotary shaft $A_{i,1}$, $A_{i,2}$ extending between each lower end, and an angle transmission 31, 32. Each lower rotary shaft $A_{i,1}$, $A_{i,2}$ is respectively parallel to a rotation axis $\Delta_1$, $\Delta_2$. Each angle transmission forms a mechanical connection between a lower rotary shaft $A_{i,1}$, $A_{i,2}$, inclined to the horizontal, and a horizontal driven shaft $A_{r,1}$, $A_{r,2}$ of the generator 30, parallel to the lateral axis Y. Each driven shaft drives a through-shaft of the single generator 30. The connection between each driven shaft and the through-shaft of the generator can be ensured by two flexible, preferably constant-velocity couplings arranged on the two sides of the generator. The flexible couplings connect the driven shafts $A_{r,1}$, $A_{r,2}$ to the through-shaft of the generator 30. The flexibility of each coupling compensates for any misalignment, for example resulting from vibrations or jolting of the turbine.

FIG. 7B shows a detail of a stack of elements from the turbine 20 to the angle transmission 32. The stack comprises a blade root flange 38, a brake disk 37, brake shoes 36, a plate 35, forming one end of a plate gearbox 34. The use of a plate gearbox is preferred to minimize the dimension parallel to the rotation axis. This minimizes any lever-arm effects. The rotation is transmitted by screws connecting the flange 38 to a periphery of the plate 35, then by the lower shaft $A_{i,2}$ connected to the gearbox 34. The lower shaft $A_{i,2}$ has coupling splines 33 that fit into the angle transmission 32. Such an arrangement forms a pivot link, comprising a brake stage comprising a brake disk 37 and brake shoes 36. The brake shoes 36 are supported by the gearbox 34. The brake shoes are designed to bear against the brake disk 37, which is rigidly connected to the flange 38. This arrangement enables a brake stage to be arranged as close as possible to each turbine, and more specifically between the gearbox and the turbine. This prevents the transmission of braking torque through the gearbox. Additional brake disks can be fitted between the generator 30 and the gearbox 34. Such additional brake disks may be required during emergency braking. In one variant, some or all of the multiplication can be partially integrated into the angle transmission. In this case, the angle transmission comprises pinions with different numbers of teeth, ensuring multiplication.

The stack shown in FIG. 7B is compact, reducing the size of the nacelle. Assembly of the stack is straightforward, comprising two main components: the angle transmission 32 and the gearbox 34. The angle transmission bears against the nacelle, and the gearbox is interposed between the angle transmission and the turbine, and is connected to the turbine by the flange 38.

The stack forms a self-supporting unit, and does not require a holding part for connection to the nacelle. This results in a particularly compact nacelle. This helps to maximize the free space about the lower end of each turbine, thereby preventing the formation of eddies induced by a cumbersome nacelle or holding parts.

The stack also minimizes the distance between the lower end of the turbine and the nacelle. This reduces lever arm effects. The inclination of the two rotation axes brings the angle transmissions 32 connected to each turbine on the two sides of the generator closer together.

The wind turbine 1 comprises a control unit (not shown) that continuously optimizes the rotational speed of the turbines.

Figure 8A:
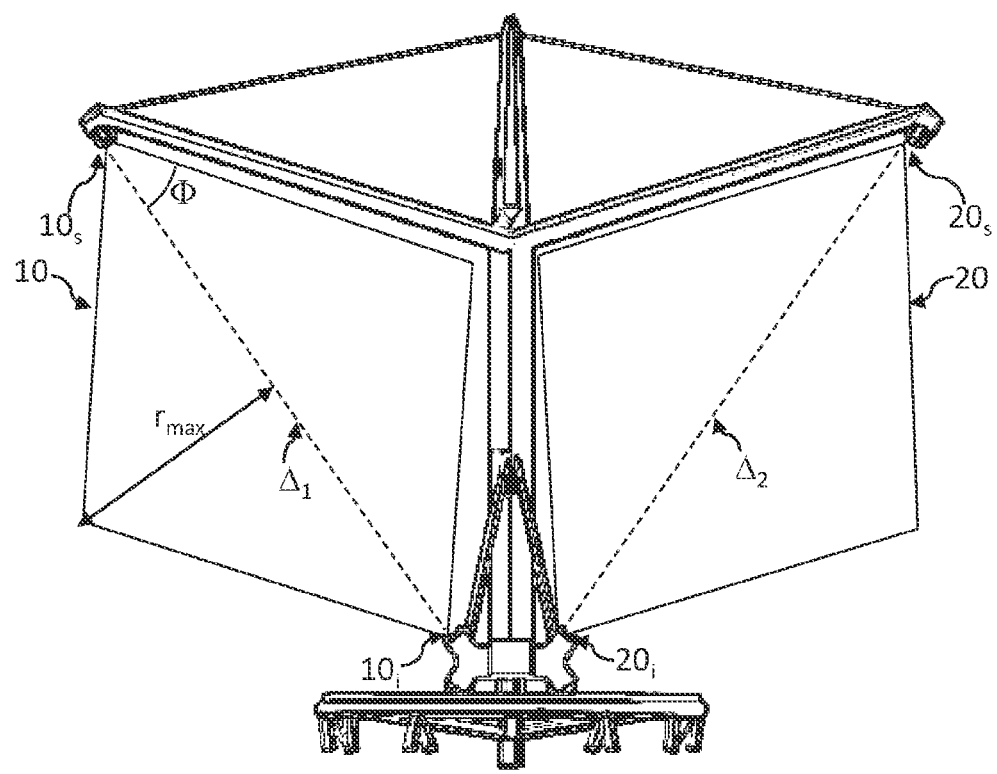
FIGS. 8A and 8B are further embodiments of a wind turbine.
Figure 8B:
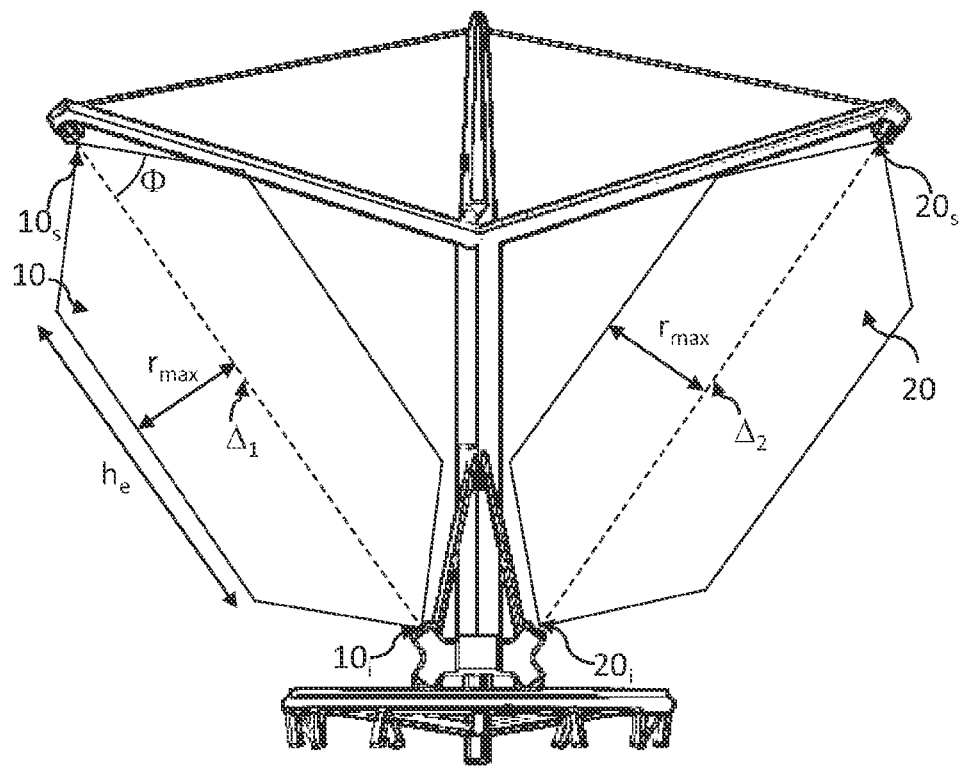

Variants:

The shape of the blades described with reference to FIGS. 2A and 2C corresponds to an optimal configuration of embodiments of the disclosure. However, the blades can have different shapes, without thereby moving outside the scope of the disclosure. FIGS. 8A and 8B show examples of blades that can be used, despite not being optimal. Such blades have the advantage of being simpler and less costly to manufacture.

In FIGS. 8A and 8B, each blade has a lower portion and a straight upper portion that are inclined in relation to the rotation axis at an opening angle $\phi$. As previously indicated, the opening angle adjacent to the upper end may be different from the opening angle at the lower end. On the blade shown in FIG. 8A, the equatorial portion is limited to a point of intersection between the lower and upper portions.

In FIG. 8B, each blade has a flat equatorial portion where the radius is greatest. The equatorial portion extends between the lower portion and the upper portion, parallel to the rotation axis of the blade.

The invention claimed is:

1. A Darrieus wind turbine comprising twin cross-flow turbines connected to a generator, the generator comprising a shaft designed to be driven in rotation under the effect of a rotation of the turbines, the wind turbine comprising:
   a first turbine movable in rotation about a first rotation axis, the first turbine comprising several blades distributed about the first rotation axis,
   a second turbine movable in rotation about a second rotation axis, the second turbine comprising several blades distributed about the second rotation axis,
   the first rotation axis and the second rotation axis being symmetrical to each other with respect to a vertical axis,
wherein:
   each turbine extends about a rotation axis between a lower end and an upper end, the lower end being closer to the generator than the upper end,
   the lower end and the upper end of each turbine are aligned with the rotation axis of said turbine,
   each turbine blade comprises:
     a lower portion, extending from the lower end,
     an upper portion, extending from the upper end,
   each blade extending from the lower end towards the upper end so that:
     the radius of the blade, corresponding to the distance between the blade and the rotation axis along the lower portion, gradually increases as the distance from the lower end increases,
     the radius of the blade gradually decreases along the upper portion as the distance from the upper end decreases,
and wherein:
   the first rotation axis and the second rotation axis are inclined with respect to the vertical axis at the same angle of inclination of between 25° and 50°,
   so that each rotation axis converges on a single generator, so that the horizontal shaft of the generator is driven in rotation by the first turbine and by the second turbine,
   the wind turbine defines a median plane, the median plane:
     being perpendicular to a downstream plane, the downstream plane containing the first rotation axis and the second rotation axis, passing through a point of intersection of the first rotation axis and the second rotation axis, the median plane forms a plane of symmetry of the wind turbine.

2. The wind turbine of claim 1, wherein, for each blade:
at the lower end, the lower portion forms a lower opening angle with the rotation axis, the lower opening angle being acute,
at the upper end, the upper portion forms an upper opening angle with the rotation axis, the upper opening angle being acute.

3. The wind turbine of claim 2, wherein the lower opening angle and the upper opening angle are equal and form the same opening angle.

4. The wind turbine of claim 3, wherein the opening angle is between 40° and 60°.

5. The wind turbine of claim 3, wherein each blade is such that the lower portion is straight and/or the upper portion is straight.

6. The wind turbine of claim 5, wherein:
each blade has an equatorial portion, connecting the lower portion and the upper portion,
in the equatorial portion, the radius of the blade reaches a maximum radius.

7. The wind turbine of claim 6, wherein:
the height of each blade corresponds to a distance between the lower end and the upper end, parallel to the rotation axis,
each blade has a form factor, corresponding to a ratio between the height of the blade and twice the maximum radius of the blade,
the form factor of each blade is between 1.3 and 1.5.

8. The wind turbine of claim 7, wherein for each blade:
the equatorial portion is curved,
along the equatorial portion, from the lower portion, the radius gradually increases to the maximum radius of the blade, then gradually decreases, up to the upper portion.

9. The wind turbine of claim 8, wherein for each turbine:
an equatorial plane extends perpendicular to the rotation axis, the equatorial plane passing through the maximum radius of each blade of the turbine,
the equatorial plane forms a plane of symmetry of the turbine.

10. The wind turbine of claim 8, wherein each blade comprises:
a lower join, corresponding to a join between the lower portion and the equatorial portion,
an upper join, corresponding to a join between the upper portion and the equatorial portion,
wherein each blade is such that:
the distance between the lower join and the upper join, parallel to the rotation axis, forms a height of the equatorial portion,
a relative height of the equatorial portion corresponds to a ratio between the height of the equatorial portion and the height of the blade,
the relative height of each blade is greater than 0.5 and less than 0.8.

11. The wind turbine of claim 6, wherein:
two blades belonging to two different turbines are separated by a minimum gap during rotation about the respective rotation axes,
a form factor of the wind turbine corresponds to a ratio between the minimum gap and twice the maximum radius,
the form factor of the wind turbine is between 0.1 and 0.3.

12. The wind turbine of claim 1, wherein each turbine comprises two blades, each blade being symmetrical to the other with respect to the rotation axis of the turbine.

13. The wind turbine of claim 1, wherein each turbine has three blades, evenly distributed about the rotation axis of the turbine.

14. The wind turbine of claim 1, wherein:
the first turbine is connected:
at the lower end thereof to a first lower rotary shaft,
at the upper end thereof to a first upper rotary shaft,
the first lower rotary shaft, the first upper rotary shaft and the first rotation axis being coaxial,
the second turbine is connected:
at the lower end thereof to a second lower rotary shaft,
at the upper end thereof to a second upper rotary shaft,
the second lower rotary shaft, the second upper rotary shaft and the second rotation axis being coaxial,
the wind turbine comprises a holding structure, the holding structure comprising:
a nacelle supporting the generator,
a mast extending vertically from the nacelle, the mast being centered with respect to the median plane, the mast being set back from the downstream plane by a setback distance in a longitudinal direction perpendicular to the downstream plane,
a first upper arm extending from the mast to a first upper support, the first upper support holding the first upper rotary shaft,
second upper arm extending from the mast to a second upper support, the second upper support holding the second upper rotary shaft,
the first upper arm and the second upper arm being inclined with respect to a vertical axis.

15. The wind turbine of claim 14, wherein:
the first upper support comprises a bearing into which the first upper rotary shaft is inserted,
the second upper support comprises a bearing into which the second upper rotary shaft is inserted.

16. The wind turbine of claim 14, wherein the holding structure also comprises: comprises:
a king post extending from the mast away from the downstream plane,
a first brace extending between the king post and the first upper arm,
a second brace, extending between the king post and the second upper arm.

17. The wind turbine of claim 16, wherein:
the first brace extends between the king post and the first upper support,
the second brace extends between the king post and the second upper support.

18. The wind turbine of claim 14, wherein the first upper arm and the second upper arm comprise successive elementary arms, extending respectively towards the first upper support and the second upper support, each elementary arm being more inclined with respect to the vertical as said elementary arm approaches the first upper support or the second upper support.

19. The wind turbine of claim 14, wherein at least one strut extends between the mast and the nacelle, the strut being inclined with respect to the vertical and extending from the mast towards the downstream plane.

20. The wind turbine of claim 14, wherein the nacelle is movable in rotation about a vertical rotation axis, about which the mast extends, so that the wind blowing in a direction spontaneously positions the turbines downstream of the mast, in said direction, under the effect of the thrust exerted by the wind on each turbine.

21. The wind turbine of claim 14, wherein the nacelle is fixed in rotation, and wherein the first and second turbines are arranged downstream of the mast, in a direction corresponding to a prevailing wind direction.

22. The wind turbine of claim 14, wherein the first lower rotary shaft and the second lower rotary shaft are is connected to the shaft of the generator by an angle transmission.

23. The wind turbine of claim 22, wherein a brake is arranged between each angle transmission and each respective lower end of each turbine.

24. The wind turbine of claim 1, wherein at least one crosspiece is arranged between two different blades of the same turbine.

* * * * *

UNITED STATES PATENT AND TRADEMARK OFFICE
CERTIFICATE OF CORRECTION

PATENT NO. : 12,078,149 B2
APPLICATION NO. : 18/547083
DATED : September 3, 2024
INVENTOR(S) : Jean-Luc Achard and Sébastien Cussac It is certified that error appears in the above-identified patent and that said Letters Patent is hereby corrected as shown below:

In the Specification

| | | |
|---|---|---|
| Column 9, | Line 66, | change "and sin($\phi$). The" to --and sin ($\phi$). The-- |
| Column 14, | Lines 4-5, | change "vertical mast 50, and" to --vertical mast 50$_i$ and-- |
| Column 14, | Line 11, | change "the mast 50, is" to --the mast 50$_i$ is-- |
| Column 14, | Lines 13-14, | change "mast 50, towards the" to --mast 50$_i$ towards the-- |
| Column 14, | Line 22, | change "mast 50, away from" to --mast 50$_i$ away from-- |
| Column 16, | Line 6, | change "the mast 50, towards" to --the mast 50$_i$ towards-- |
| Column 19, | Line 2, | change "the mast 50, has" to --the mast 50$_i$ has-- |
| Column 19, | Line 19, | change "the mast 50, can act" to --the mast 50$_i$ can act-- |
| Column 20, | Line 38, | change "two-blade turbines, respectively, As" to --two-blade turbines, respectively. As-- |

In the Claims

| | | | |
|---|---|---|---|
| Claim 14, | Column 24, | Line 30, | change "second upper arm" to --a second upper arm-- |
| Claim 16, | Column 24, | Line 41, | change "structure also comprises: comprises:" to --structure also comprises:-- |
| Claim 22, | Column 25, | Lines 8-9, | change "shaft are is connected" to --shaft are connected-- |

Signed and Sealed this
Twenty-fourth Day of December, 2024

Derrick Brent
*Acting Director of the United States Patent and Trademark Office*